US011521193B2

(12) United States Patent
Woo et al.

(10) Patent No.: US 11,521,193 B2
(45) Date of Patent: Dec. 6, 2022

(54) ELECTRONIC PAYMENT METHOD AND ELECTRONIC DEVICE FOR SUPPORTING THE SAME

(71) Applicant: Samsung Electronics Co., Ltd., Gyeonggi-do (KR)

(72) Inventors: Moon Young Woo, Gyeonggi-do (KR); Ik Hyun Kim, Seoul (KR); Bo Kun Choi, Seoul (KR)

(73) Assignee: Samsung Electronics Co., Ltd.

( * ) Notice: Subject to any disclaimer, the term of this patent is extended or adjusted under 35 U.S.C. 154(b) by 389 days.

(21) Appl. No.: 16/468,872

(22) PCT Filed: Dec. 19, 2017

(86) PCT No.: PCT/KR2017/014995
§ 371 (c)(1),
(2) Date: Jun. 12, 2019

(87) PCT Pub. No.: WO2018/117585
PCT Pub. Date: Jun. 28, 2018

(65) Prior Publication Data
US 2020/0082378 A1    Mar. 12, 2020

(30) Foreign Application Priority Data

Dec. 19, 2016    (KR) .................. 10-2016-0173604

(51) Int. Cl.
*G06Q 30/00*    (2012.01)
*G06Q 20/32*    (2012.01)
(Continued)

(52) U.S. Cl.
CPC ..... *G06Q 20/3223* (2013.01); *G06F 16/9554* (2019.01); *G06Q 20/3821* (2013.01); *G06Q 30/0627* (2013.01); *G06Q 30/0643* (2013.01)

(58) Field of Classification Search
CPC .......... G06Q 20/3223; G06Q 20/3821; G06Q 30/0627; G06Q 30/0643; G06F 16/9554
(Continued)

(56) References Cited

U.S. PATENT DOCUMENTS 8,296,195 B2 * 10/2012 Harb .................. G06Q 30/06
   705/26.42
8,438,110 B2    5/2013 Calman et al.
(Continued)

FOREIGN PATENT DOCUMENTS

JP    2004-287592    10/2004

OTHER PUBLICATIONS

Highly Robust Audio Fingerprinting System Haitsma et al., International Conference on Music, 9pgs. (Year: 2002).*
(Continued)

*Primary Examiner* — Robert M Pond
(74) *Attorney, Agent, or Firm* — The Farrell Law Firm, P.C.

(57) ABSTRACT

An electronic device is provided. The electronic device includes a memory configured to store at least one first information provided from an external server in connection with operating electronic payment, a display configured to output a user interface (UI) accompanied with the electronic payment, and a processor configured to be electrically connected with the memory and the display. The processor is configured to detect at least one second information associated with an environment where the electronic device is operated, determine a product to perform the electronic payment, based on the first information and the second information, and include and output information about the product and payment information associated with payment of the product on a specified region of the UI.

6 Claims, 26 Drawing Sheets

(51) Int. Cl.
*G06F 16/955* (2019.01)
*G06Q 20/38* (2012.01)
*G06Q 30/06* (2012.01)

(58) Field of Classification Search
USPC .............................................. 705/26, 27, 4, 2
See application file for complete search history.

(56) References Cited

U.S. PATENT DOCUMENTS

| | | |
|---|---|---|
| 8,571,888 B2 | 10/2013 | Calman et al. |
| 8,582,850 B2 | 11/2013 | Calman et al. |
| 8,611,601 B2 | 12/2013 | Calman et al. |
| 8,660,951 B2 | 2/2014 | Calman et al. |
| 8,668,498 B2 | 3/2014 | Calman et al. |
| 8,688,559 B2 | 4/2014 | Calman et al. |
| 8,713,593 B2 | 4/2014 | Humphrey et al. |
| 8,718,612 B2 | 5/2014 | Calman et al. |
| 8,721,337 B2 | 5/2014 | Calman et al. |
| 8,811,711 B2 | 8/2014 | Calman et al. |
| 8,873,807 B2 | 10/2014 | Calman et al. |
| 8,922,657 B2 | 12/2014 | Calman et al. |
| 8,929,591 B2 | 1/2015 | Calman et al. |
| 9,105,011 B2 | 8/2015 | Calman et al. |
| 9,223,902 B1 | 12/2015 | McHugh et al. |
| 9,224,166 B2 | 12/2015 | Calman et al. |
| 9,262,739 B2 | 2/2016 | Scrivner |
| 9,317,835 B2 | 4/2016 | Calman et al. |
| 9,317,860 B2 | 4/2016 | Calman et al. |
| 9,406,031 B2 | 8/2016 | Calman et al. |
| 9,519,913 B2 | 12/2016 | Calman et al. |
| 9,519,923 B2 | 12/2016 | Calman et al. |
| 9,519,924 B2 | 12/2016 | Calman et al. |
| 9,519,932 B2 | 12/2016 | Calman et al. |
| 9,524,524 B2 | 12/2016 | Calman et al. |
| 9,530,145 B2 | 12/2016 | Calman et al. |
| 9,773,285 B2 | 9/2017 | Calman et al. |
| 10,049,394 B2 * | 8/2018 | Ballesteros ...... G06Q 20/40145 |
| 10,268,890 B2 | 4/2019 | Calman et al. |
| 10,268,891 B2 | 4/2019 | Calman et al. |
| 2011/0191253 A1 * | 8/2011 | Pilskalns ................. G06Q 40/12 705/14.27 |
| 2011/0214143 A1 | 9/2011 | Rits et al. |
| 2012/0216226 A1 * | 8/2012 | Humphrey ......... H04N 21/8586 725/34 |
| 2012/0229624 A1 | 9/2012 | Calman et al. |
| 2012/0229625 A1 | 9/2012 | Calman et al. |
| 2012/0229647 A1 | 9/2012 | Calman et al. |
| 2012/0229657 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232954 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233015 A1 | 9/2012 | Calman et al. |
| 2012/0233025 A1 | 9/2012 | Caiman et al. |
| 2012/0233032 A1 | 9/2012 | Calman et al. |
| 2012/0233033 A1 | 9/2012 | Calman et al. |
| 2012/0233070 A1 | 9/2012 | Calman et al. |
| 2012/0233072 A1 | 9/2012 | Calman et al. |
| 2012/0233089 A1 | 9/2012 | Calman et al. |
| 2013/0033522 A1 | 2/2013 | Calman et al. |
| 2013/0036050 A1 | 2/2013 | Giordano et al. |
| 2014/0006206 A1 | 1/2014 | Scrivner |
| 2014/0006273 A1 * | 1/2014 | Gopinath ............... G06Q 20/10 705/40 |
| 2014/0250466 A1 | 9/2014 | Lieberkuhn et al. |
| 2014/0369169 A1 * | 12/2014 | Iida ........................ H04B 11/00 367/135 |
| 2016/0117750 A1 | 4/2016 | Calman et al. |
| 2016/0125415 A1 | 5/2016 | Mardikar et al. |
| 2016/0132864 A1 | 5/2016 | Barrese et al. |
| 2016/0162960 A1 | 6/2016 | Calman et al. |
| 2016/0162964 A1 | 6/2016 | Calman et al. |
| 2016/0162982 A1 | 6/2016 | Calman et al. |
| 2016/0163000 A1 | 6/2016 | Calman et al. |
| 2016/0171306 A1 | 6/2016 | Calman et al. |
| 2016/0189258 A1 | 6/2016 | Ballesteros et al. |
| 2016/0224984 A1 | 8/2016 | Mardikar et al. |
| 2016/0267506 A1 | 9/2016 | Calman et al. |
| 2016/0267507 A1 | 9/2016 | Calman et al. |
| 2016/0342995 A9 | 11/2016 | Mardikar et al. |
| 2017/0287061 A1 * | 10/2017 | Chae ................... G06Q 30/0623 |
| 2018/0096340 A1 * | 4/2018 | Omojola ............... G06Q 20/354 |

OTHER PUBLICATIONS

PCT/ISA/210 Search Report issued on PCT/KR2017/014995, pp. 4.
PCT/ISA/237 Written Opinion issued on PCT/KR2017/014995, pp. 6.
European Search Report dated Oct. 24, 2019 issued in counterpart application No. 17884625.9-1217, 7 pages.

* cited by examiner

ELECTRONIC PAYMENT METHOD AND ELECTRONIC DEVICE FOR SUPPORTING THE SAME

PRIORITY

This application is a National Phase Entry of PCT International Application No. PCT/KR2017/014995 which was filed on Dec. 19, 2017, and claims priority to Korean Patent Application No. 10-2016-0173604, which was filed on Dec. 19, 2016, the content of each of which is incorporated herein by reference.

TECHNICAL FIELD

The present disclosure relates to electronic payment technologies of electronic devices.

BACKGROUND ART

Recently, as electronic devices, each of which has its own operating system (OS), are spread faster and faster, each of the electronic devices may perform a variety of functions over networks. For example, an electronic device may support an electronic payment system for storing information about a debit card and/or a credit card of its user and purchasing a product or processing a price of the product online or offline using the information about the debit card and/or the credit card.

DISCLOSURE OF INVENTION

Technical Problem

Purchasing a product and processing a price of the product through an electronic payment system may request a user to perform a plurality of operations. For example, the user should search for a product he or she wants to purchase through web surfing and should input information, such as an identification number, an expiration date, or a password for a debit card or a credit card, upon price processing. Further, the user may perform identification or authentication through an electronic signature such as a public certificate. Thus, the electronic payment system may entail a multi-stage screen shift and may delay a time taken to purchase a product or process a price of the product or may result in an inconvenience to a user by processing a user input on each screen.

Aspects of the present disclosure are to address at least the above-mentioned problems and/or disadvantages and to provide at least the advantages described below. Accordingly, an aspect of the present disclosure is to provide an electronic payment method for implementing simple electronic payment by determining a product to perform electronic payment, based on information associated with an environment where an electronic device is operated and processing information and purchase payment about the product on a single screen and an electronic device for supporting the same.

Aspects of the present disclosure are to address at least the above-mentioned problems and/or disadvantages and to provide at least the advantages described below. Accordingly, an aspect of the present disclosure is to provide an electronic payment method for implementing simple electronic payment by determining a product to perform electronic payment, based on information associated with an environment where an electronic device is operated and processing information and purchase payment about the product on a single screen and an electronic device for supporting the same.

Solution to Problem

In accordance with an aspect of the present disclosure, an electronic device is provided. The electronic device may include a memory configured to store at least one first information provided from an external server in connection with operating electronic payment, a display configured to output a user interface (UI) accompanied with the electronic payment, and a processor configured to be electrically connected with the memory and the display.

According to an embodiment, the processor may be configured to detect at least one second information associated with an environment where the electronic device is operated, determine a product to perform the electronic payment, based on the first information and the second information, and include and output information about the product and payment information associated with payment of the product on a specified region of the UI.

Advantageous Effects of Invention

According to various embodiments, a time taken to search for a product to be purchased through electronic payment, obtain information, or process a price of the product may be reduced.

According to various embodiments, the electronic device may provide an optimized electronic payment interface by removing a frequent screen shift which may occur in an electronic payment operation.

In addition, various effects directly or indirectly ascertained through the present disclosure may be provided. Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1A:
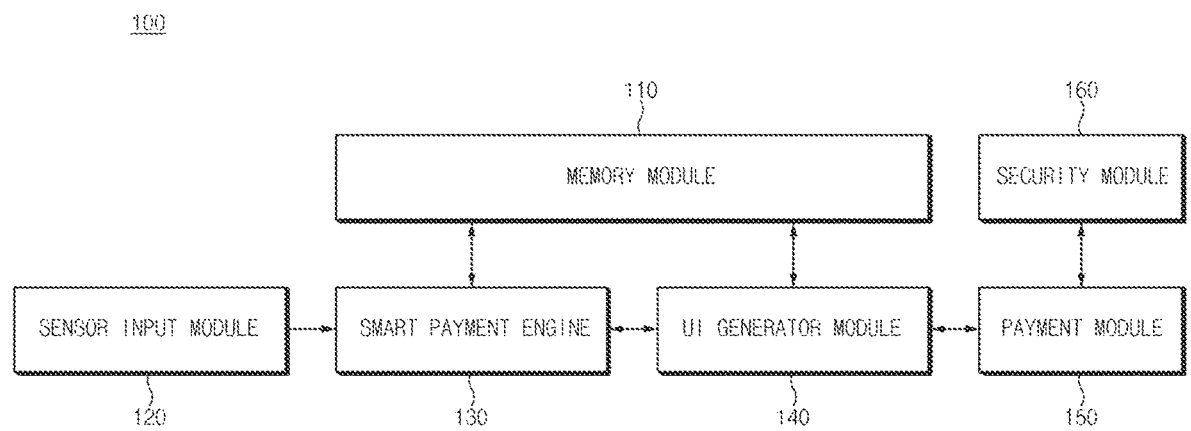
FIG. 1a is a block diagram illustrating a partial configuration of an electronic device according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different user devices regardless of order or importance. For example, a first component may be referred to as a second component and vice versa without departing from the scope of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA) device, a magnetic resonance imaging (MRI) device, a computed tomography (CT) device, a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 1B:
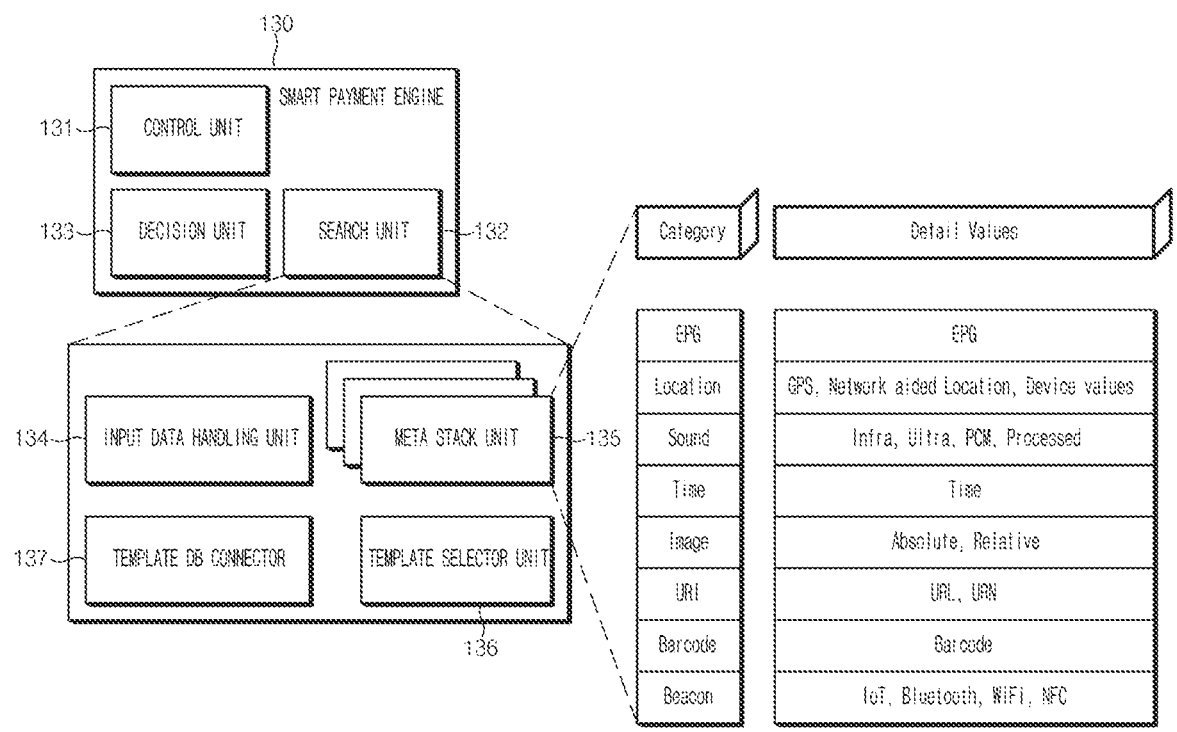
FIG. 1b is a block diagram illustrating a configuration of a smart payment engine according to an embodiment.

FIG. 1a is a block diagram illustrating a partial configuration of an electronic device according to an embodiment. FIG. 1b is a block diagram illustrating a configuration of a smart payment engine according to an embodiment.

Referring to FIG. 1a, an electronic device 100 may include a memory module 110, a sensor input module 120, a smart payment engine 130, a user interface (UI) generator module 140, a payment module 150, and a security module 160. In an embodiment, at least one of the above-mentioned elements may be implemented with a software program or a hardware module (e.g., a processor, a controller, or the like), and at least some of the above-mentioned elements may be loaded or located in a trust zone implemented in the electronic device 100 (e.g., a security area accessible based on a specified root or signal). The security module 160 may include, for example, a security memory device, and the security memory device may include a security memory area and a security processor which may access the security memory area and may perform data processing.

The memory module 110 (or a memory) may store at least one information associated with an environment in which the electronic device 100 is operated. For example, the memory module 110 may store originating sound signal information of a peripheral device, which may be obtained by the sensor input module 120, location information of the electronic device 100, image capture information of the electronic device 100, or the like. Further, the memory module 110 may store information about at least a product associated with operating an electronic payment function or website information associated with a store of the product, the product information and the website information being downloaded (or streamed) from an external device or an external server which constructs a network with the electronic device 100, in a database (DB). In an embodiment, the memory module 110 may store at least one product information in different DBs. For example, the memory module 110 may store at least one product information, classified according to a country or area where the product is manufactured, for each manufacturing country or each manufacturing area. In an embodiment, the memory module 110 may store at least one application program associated with operating an electronic payment function of the electronic device 100. For example, the memory module 110 may include an electronic payment application program, a gallery application program, a web browser application program, or the like.

The sensor input module 120 (or a sensor input processor) may detect a change in physical quantity (e.g., a tilt, pressure, or the like) provided to the electronic device 100, based on at least one sensor, and may transmit information about the sensed change to the smart payment engine 130. After detecting the change in physical quantity to the electronic device 100, the sensor input module 120 may detect, obtain, or read a signal, data, a code, or the like associated with an environment where the electronic device 100 is operated. For example, the sensor input module 120 may detect, obtain, or read a sound signal originating from a device around the electronic device 100, metadata or uniform resource identifier (URI) data included in an application program executed by the electronic device 100, location information of the electronic device 100, a quick response (QR) code or a bar code which exists in a region around the electronic device 100, or the like. In this regard, the sensor input module 120 may include at least one of, for example, a sensor module (e.g., including at least one of an acceleration sensor, a gyro sensor, a geomagnetic sensor, a pressure sensor, an atmospheric pressure sensor, a humidity sensor, a temperature sensor, an image sensor, or an infrared sensor), a camera module, a global positioning system (GPS) module, or a microphone module. In an embodiment, the sensor input module 120 may detect, obtain, or read the signal, data, code, or the like based on the at least one module (e.g., the sensor module, the camera module, the GPS module, the microphone module, or the like) or may receive the signal, data, code, or the like over a network from an external device or a server. The sensor input module 120 may transmit at least one detected, obtained, or read information (e.g., a signal, data, a code, or the like) to the memory module 110 and the smart payment engine 130.

The smart payment engine 130 may be activated by receiving information about a change in physical quantity to the electronic device 100 from the sensor input module 120. In various embodiments, the smart payment engine 130 may be activated according to user control. For example, if an electronic payment application program is executed by the user control, the smart payment engine 130 may be triggered and activated. The activated smart payment engine 130 may determine a product to perform electronic payment, based on at least one information detected, obtained, or read by the sensor input module 120.

Referring to FIG. 1b, the smart payment engine 130 according to an embodiment may include a control unit 131, a search unit 132, and a decision unit 133 in connection with performing a function. If the smart payment engine 130 is implemented with a hardware processor, the control unit 131, the search unit 132, or the decision unit 133 may function as a sub-processor of the smart payment engine 130. Alternatively, at least one of the control unit 131, the search unit 132, or the decision unit 133 may be implemented with a program module uploaded to the smart payment engine 130.

The control unit 131 may control a function operation of each of the search unit 132 and the decision unit 133 and may transmit at least one detected, obtained, or read information provided from the sensor input module 120 to the search unit 132. The search unit 132 may identify a DB including product information associated with a country or area corresponding to a location of the electronic device 100 among at least one DB based on location information of the electronic device 100, detected by the sensor input module 120. According to various embodiments, if receiving location information of a user (or the electronic device 100) from a user input (e.g., a text input or the like), the search unit 132 may identify a DB including product information corresponding to the location. Alternatively, the search unit 132 may provide collected location information (e.g., information about a location of the electronic device 100, obtained based on a sensor, or a location input from a user) to an external device or an external server to request the external device or the external server to search for product information (e.g., specialty information, souvenir information, or the like) associated with the location.

In an embodiment, the search unit 132 may include an input data handling unit 134, a meta stack unit 135, a template selector unit 136, and a template DB connector 137. At least one information detected, obtained, or read by the sensor input module 120 may be transmitted to the input data handling unit 134 of the search unit 132 by the control unit 131. The input data handling unit 134 may convert the at least one transmitted information into a classifiable metadata format. The converted metadata may be classified according to a specified criterion on the meta stack unit 135. The meta stack unit 135 may include a classification criterion, for example, location information, uniform resource locator (URL) information, sound signal information, time information, or bar code information and may classify the converted metadata based on the criterion. The template selector unit 136 may select a template associated with location information of the electronic device 100 on the classified metadata and may transmit the selected template to the template DB connector 137. The template DB connector 137 may identify a specific DB (e.g., a DB including product information corresponding to a location of the electronic device 100) on at least one DB of the memory module 110 based on the transmitted template. The decision unit 133 may determine at least one product corresponding to product information on the identified DB as a product associated with an environment (e.g., a location) where the electronic device 100 is operated.

The UI generator module 140 may generate a UI associated with operating an electronic payment function of the electronic device 100. For example, the UI generator module 140 may generate a UI including information about a product to perform electronic payment, determined by the smart payment engine 130, and payment information associated with processing a price of the product. In this regard, the UI generator module 140 may access the security module 160 to obtain the payment information (e.g., information about a debit card and/or a credit card, user address information, user contact information, or the like) or obtain the payment information from the payment module 150 described below. In an embodiment, the UI generator module 140 may divide the generated UI into a first region and a second region and may include the product information and the payment information in the first and second regions, respectively. The UI generator module 140 may include a web page associated with a store of a product or a log-in interface which supports to access a server in at least part of the region which includes the product information. In an embodiment, the UI generator module 140 may further generate a UI including payment completion information of a product, other than a UI including the product information and the payment information. Data associated with the UI generated by the UI generator module 140 may be transmitted to, for example, a display (not shown) included in the electronic device 100. The UI may configure at least part of a screen where an electronic payment application program is executed.

The payment module 150 may perform a payment process for a product determined by the smart payment engine 130 (e.g., the decision module 133 of the smart payment engine 130). For example, if a user input associated with payment approval is provided on the UI including the product information and the payment information and if a specified user authentication procedure is completed, the payment module 150 may transmit purchase information to an external device or an external server associated with a product to pay (e.g., a device or a server operated in a store of the product to pay). In this regard, the electronic device 100 may further include a communication interface (or a communication circuit) for transmitting the purchase information. Alternatively, if a user input associated with activating an offline payment function of the electronic device 100 is provided, the payment module 150 may transmit purchase information to the external device or the external server based on a magnetic secure transmission (MST) scheme or a near field communication (NFC) scheme. The purchase information may include, for example, information of a product to pay and payment information (e.g., information about a debit card or a credit card, such as a user name, user address information, user contact information, or the like). In an embodiment, the payment module 150 may store history information of a paid product in the memory module 110. The payment module 150 may refer to the history information in a payment process for any product. For example, if a payment history for a product to pay exists on the memory module 110, the payment module 150 may transmit the history information of the product to the UI generator module 140. The UI generator module 140 may include product information, which is simplified or at least partial information of which is omitted, in the above-mentioned UI (e.g., the UI including the product information and the payment information) based on the transmitted history information.

The security module 160 may support a payment function process of the payment module 150 based on specified user authentication. For example, if a user input associated with payment approval is provided on the UI, the security module 160 may activate a specified security platform (e.g., Knox) or a biometric system. Only if stability for user authentication is determined, the security module 160 may authorize the payment module 150 to access a specified security area (e.g., a trust zone). The security area may include user personal information, for example, a name, gender, an address, or contact information, and financial information, for example, a serial number of a debit card or a credit card or an account number. In an embodiment, the security module 160 may support encryption or decryption in connection with storing history information of the above-mentioned product or obtaining stored history information.

In various embodiments, the electronic device 100 may fail to include at least one of the above-mentioned elements or may further include another element. For example, the electronic device 100 may further include a display, a communication interface, or a processor. The display may output a screen associated with operating an electronic payment function of the electronic device 100. For example, the display may output a UI generated by the UI generator module 140, a web page associated with a store of a product to perform electronic payment, received from an external device or an external server, or the like. The communication interface may establish a network with the external device or the external server associated with operating the electronic payment function of the electronic device 100. The communication interface may establish wired or wireless communication with the external device or the external server based on the network and may transmit and receive a signal or data associated with electronic payment. The processor may be electrically or operatively connected with at least one other element(s) of the electronic device 100 and may perform control associated with communication, various arithmetic operations, or data processing. In an embodiment, the processor may control the above-mentioned overall elements of the electronic device 100. Alternatively, the processor may be implemented with at least some (e.g., the smart payment engine 130, the UI generator module 140, the payment module 150, or the like) of the elements of the electronic device 100 or may act as a proxy in function operations of the at least some of the elements of the electronic device 100.

Figure 2:
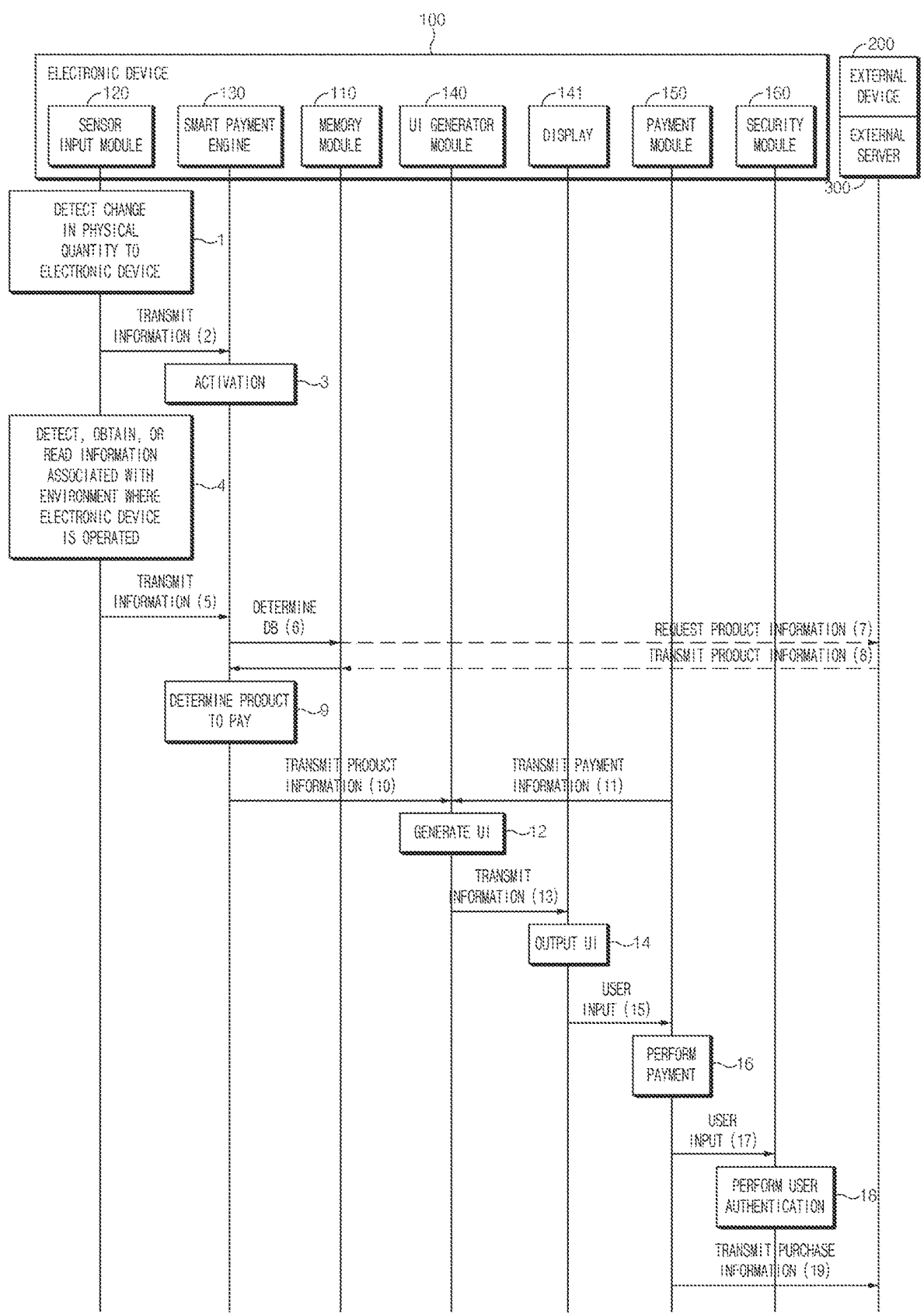
FIG. 2 is a signal sequence diagram illustrating an electronic payment method of an electronic device according to an embodiment.

FIG. 2 is a signal sequence diagram illustrating an electronic payment method of an electronic device according to an embodiment.

Referring to FIG. 2, in operation 1, a sensor input module 120 may detect a change in physical quantity which has an influence on an electronic device 100 which is in a screen-off state and in a state where at least one sensor is activated. For example, the sensor input module 120 may detect a change in acceleration, pressure, temperature, or the like, which has an influence on the electronic device 100 as a user holds the electronic device 100 or makes contact with the electronic device 100. In operations 2 and 3, the sensor input module 120 may transmit information about the sensed change in physical quantity to the electronic device 100 to the smart payment engine 130. The smart payment engine 130 may be (triggered or) activated in response to the transmitted information about the change in physical quantity. According to various embodiments, the smart payment engine 130 may be activated in response to user control. For example, if a physical quantity to the electronic device 100 is changed, an interface of a specified shape (e.g., a tap, a button, or the like) may be displayed on one region (e.g., a lower region) of a display screen of the electronic device 100. If a user input is provided to the interface, an electronic payment application program may be executed and the smart payment engine 130 may be activated in response to the execution of the electronic payment application program.

In operation 4, the sensor input module 120 may detect, obtain, or read information (hereinafter referred to as "environment information") associated with an environment where the electronic device 100 is operated. For example, the sensor input module 120 may detect, obtain, or read environment information such as a sound signal originating from a peripheral device adjacent to the electronic device 100, metadata or URI data included in an application program executed by the electronic device 100, location information of the electronic device 100, and a QR code or a bar code which exists in a region around the electronic device 100. In various embodiments, in connection with recognizing the code, the electronic device 100 may further include a code scanner or the like.

In operations 5 and 6, the smart payment engine 130 may determine a DB to be used to operate an electronic payment function of the electronic device 100 based on the environment information transmitted from the sensor input module 120. The smart payment engine 130 may identify and determine a DB corresponding to the environment information among at least one DB constructed in a memory module 110. For example, the smart payment engine 130 may determine a DB (hereinafter referred to as "utilization DB") including information about at least one product manufactured or sold in a country or area corresponding to a location of the electronic device 100, based on location information of the electronic device 100 (e.g., a location of the electronic device 100, obtained based on a sensor, and a location input from a user).

In an embodiment, if there is no product information corresponding to a location of the electronic device 100 in the at least one DB, in operations 7 and 8, the smart payment engine 130 may request an external device 200 or an external server 300 associated with the detected, obtained, or read environment information to transmit product information corresponding to the environment information and may download (or stream) the product information. The product information provided from the external device 200 or the external server 300 may be updated to at least one DB of the memory module 110.

In operation 9, the smart payment engine 130 may analyze the utility DB determined based on the detected, obtained, or read environment information and may determine at least one product according to at least one product information included in the utility DB as a product to perform electronic payment. Alternatively, the smart payment engine 130 may request the external device 200 or the external server 300 to transmit product information associated with the environment information and may determine a product corresponding to the downloaded product information as a product to perform electronic payment.

In operations 10 and 11, a UI generator module 140 may respectively receive information of the product determined to perform the electronic payment and payment information associated with processing a price of the product from the smart payment engine 130 and a payment module 150. In operations 12 and 13, the UI generator module 140 may generate a UI including the received product information and the received payment information and may transmit data associated with the UI to a display 141 of the electronic device 100. In operation 14, if an electronic payment application program is executed, the display 141 may output the UI.

If a user input associated with payment approval of a product to pay is provided on the UI output on the display 141 in operation 15, in operation 16, the payment module 150 may proceed with processing a price of the product to pay. In this operation, if a user input (e.g., a touch hold) is provided on a specified region (e.g., a home button region or the like) of the electronic device 100 in operation 17, a security platform or a biometric system in a security module 160 may be activated (e.g., a biometric sensor and a processor which processes information sensed by the biometric sensor may be activated).

In operations 18 and 19, the security module 160 may perform user authentication based on the activated security platform or the activated biometric system and may authorize the payment module 150 to access a specified security area (e.g., a trust zone) if stability for the user authentication is determined. The payment module 150 may obtain payment information (e.g., information about a debit card or a credit card of a user name, user address information, user contact information, or the like) in the security area and may transmit purchase information including the payment information and information about a product to pay to the external device 200 or the external server 300. In an embodiment, the payment module 150 may receive a payment completion response corresponding to the purchase information from the external device 200 or the external server 300.

FIGS. 3a to 3d are drawings illustrating various operations associated with executing an electronic payment application program according to an embodiment.

Figure 3A:
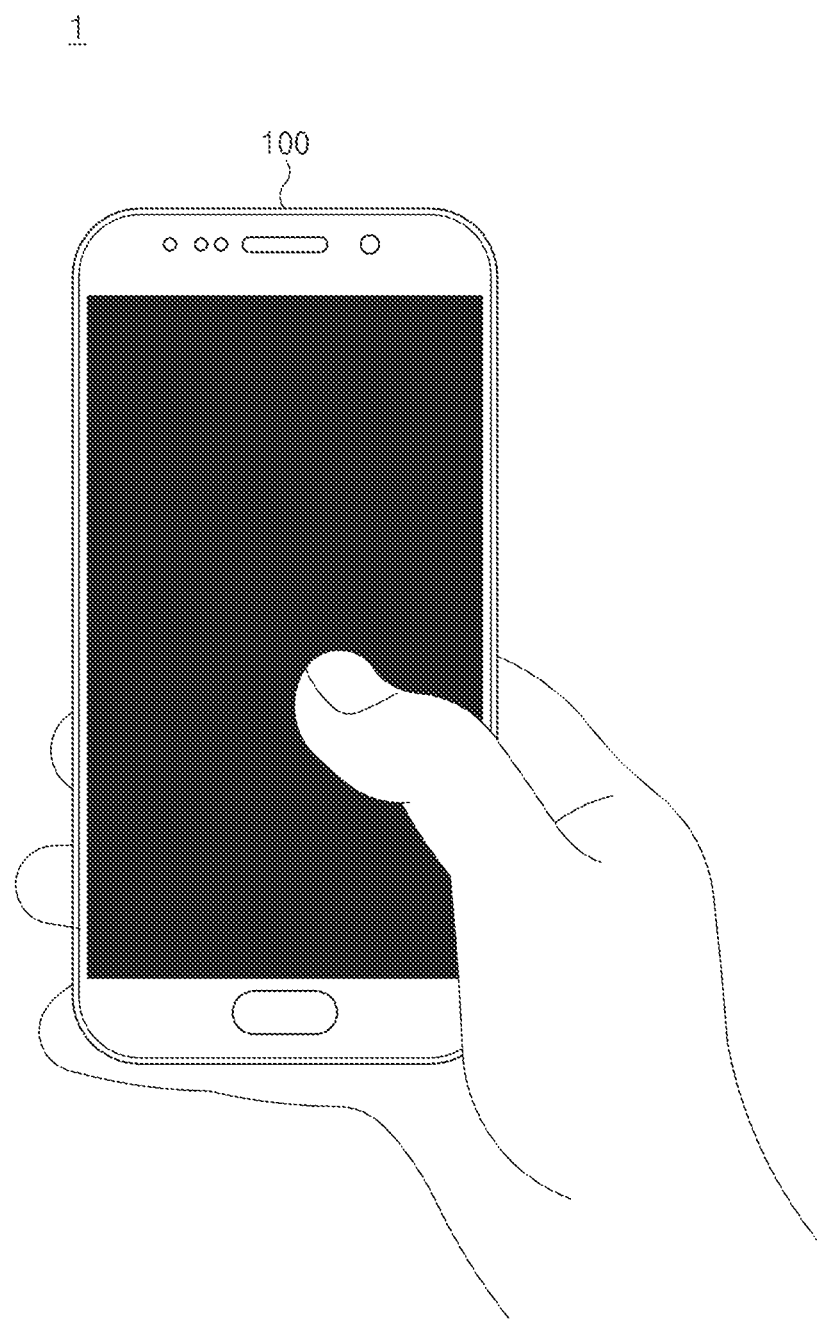
FIG. 3a is a drawing illustrating a first operation associated with executing an electronic payment application program according to an embodiment.

Referring to FIG. 3a, in operation 1, a sensor input module 120 of FIG. 1a may detect a change in physical quantity which has an influence on an electronic device 100, in real time or at a specified period. In an embodiment, if a user holds at least part of the electronic device 100 or if at least part of a user's body is in contact with the electronic device 100, motion, a change in tilt, or the like may occur in the electronic device 100 or external pressure may supplied to the electronic device 100. In this case, the sensor input module 120 may detect a change in acceleration, tilt, pressure, or the like for the electronic device 100, generated in response to the motion, the tilt, or the external pressure and may transmit information about the sensed change to a smart payment engine 130 and a UI generator module 140 of FIG. 1a.

Figure 3B:
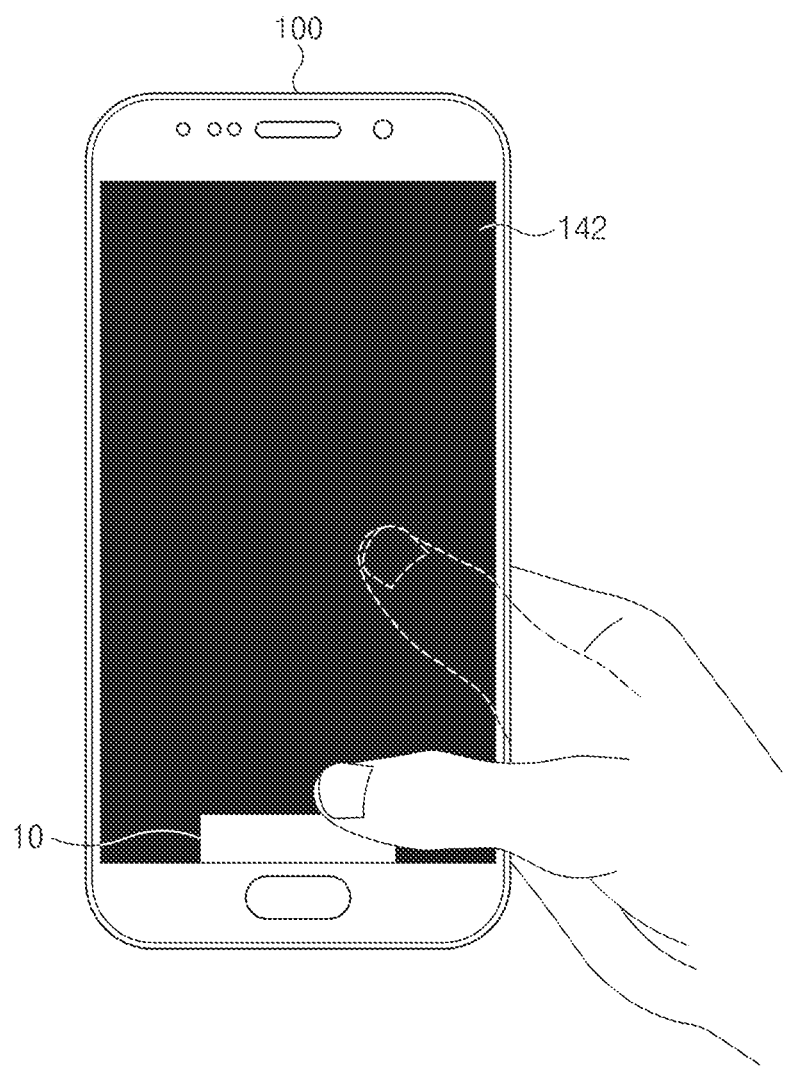
FIG. 3b is a drawing illustrating a second operation associated with executing an electronic payment application program according to an embodiment.

Referring to FIG. 3b, in operation 2, the UI generator module 140 may transmit a first interface generation signal associated with controlling execution of an electronic payment application program to a display 141 of the electronic device 100 based on information about the change in physical quantity to the electronic device 100, transmitted from the sensor input module 120. The display 141 may display a first interface 10 (e.g., a tap, a button, or the like) on at least one region (e.g., a lower end) of a screen region 142 of the display 141 in response to the first interface generation signal.

According to an embodiment, in operations 1 and 2, the electronic device 100 may be in a screen-off state and in a state where at least one specified sensor (e.g., an acceleration sensor, a gyro sensor, a geomagnetic sensor, a pressure sensor, an atmospheric pressure sensor, a humidity sensor, a temperature sensor, an image sensor, an infrared sensor, or the like) is activated. In an embodiment, a sensor operation period in the screen-off state may be set to be longer than a sensor operation period in a screen-on state. If a user input (e.g., swipe) is provided on the first interface 10, the electronic device 100 may be converted into the screen-on state and an electronic payment application program may be executed.

Figure 3C:
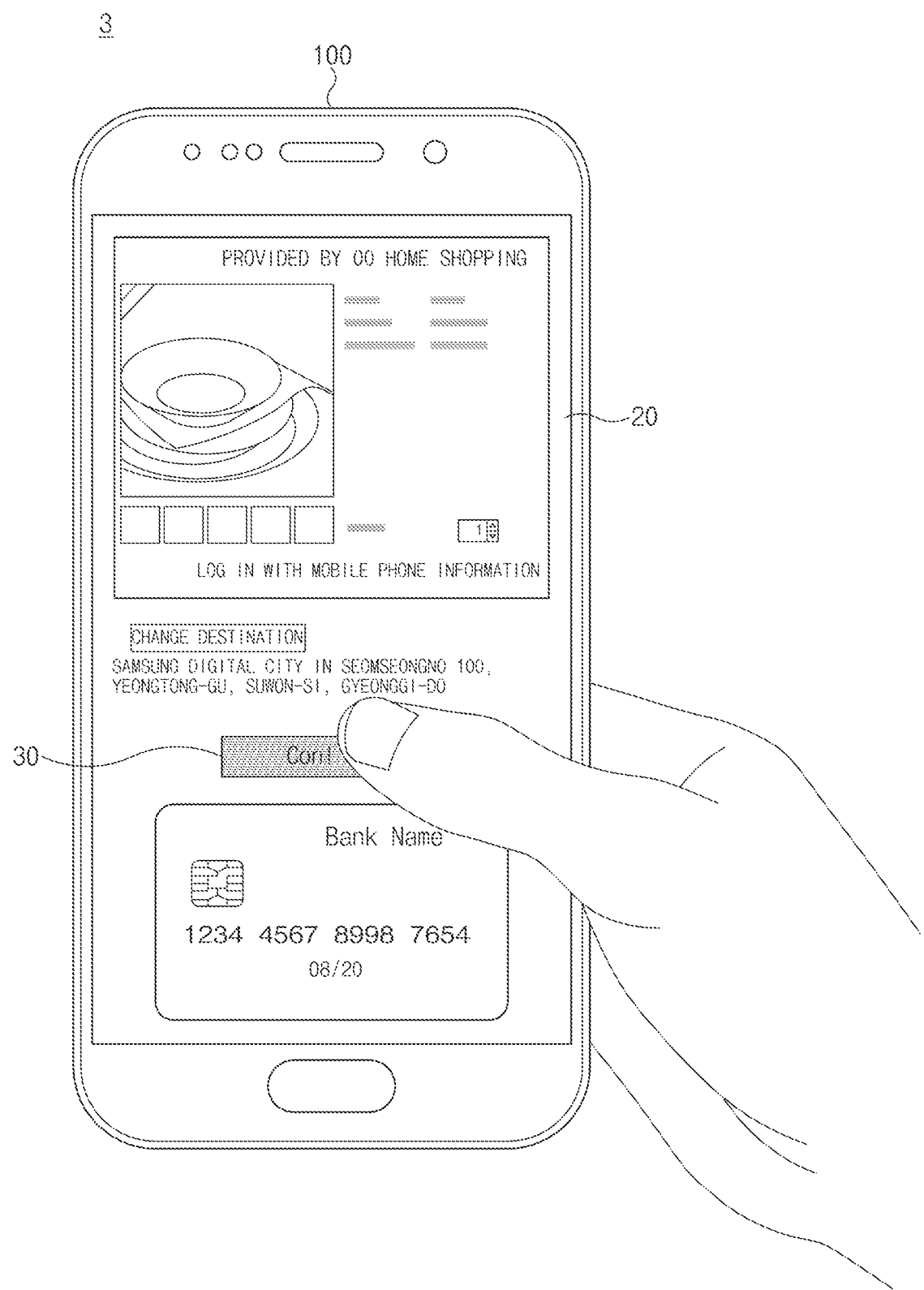
FIG. 3c is a drawing illustrating a third operation associated with executing an electronic payment application program according to an embodiment.

Referring to FIG. 3c, in operation 3, the UI generator module 140 may generate a UI associated with electronic payment based on a function operation of another element (e.g., the sensor input module 120, the smart payment engine 130, a payment module 150 of FIG. 1a, or the like) of the electronic device 100. The UI generator module 140 may transmit data associated with the generated UI to the display 141 and the display 141 may display a UI 20 corresponding to at least part of a screen where an electronic payment application program is executed. In an embodiment, the user may verify information and payment information of a product to pay on the displayed UI 20 and may provide a user input (e.g., a touch) to a second interface 30 associated with payment approval of the product. In this case, the payment module 150 may proceed with processing a price of the product to pay.

Figure 3D:
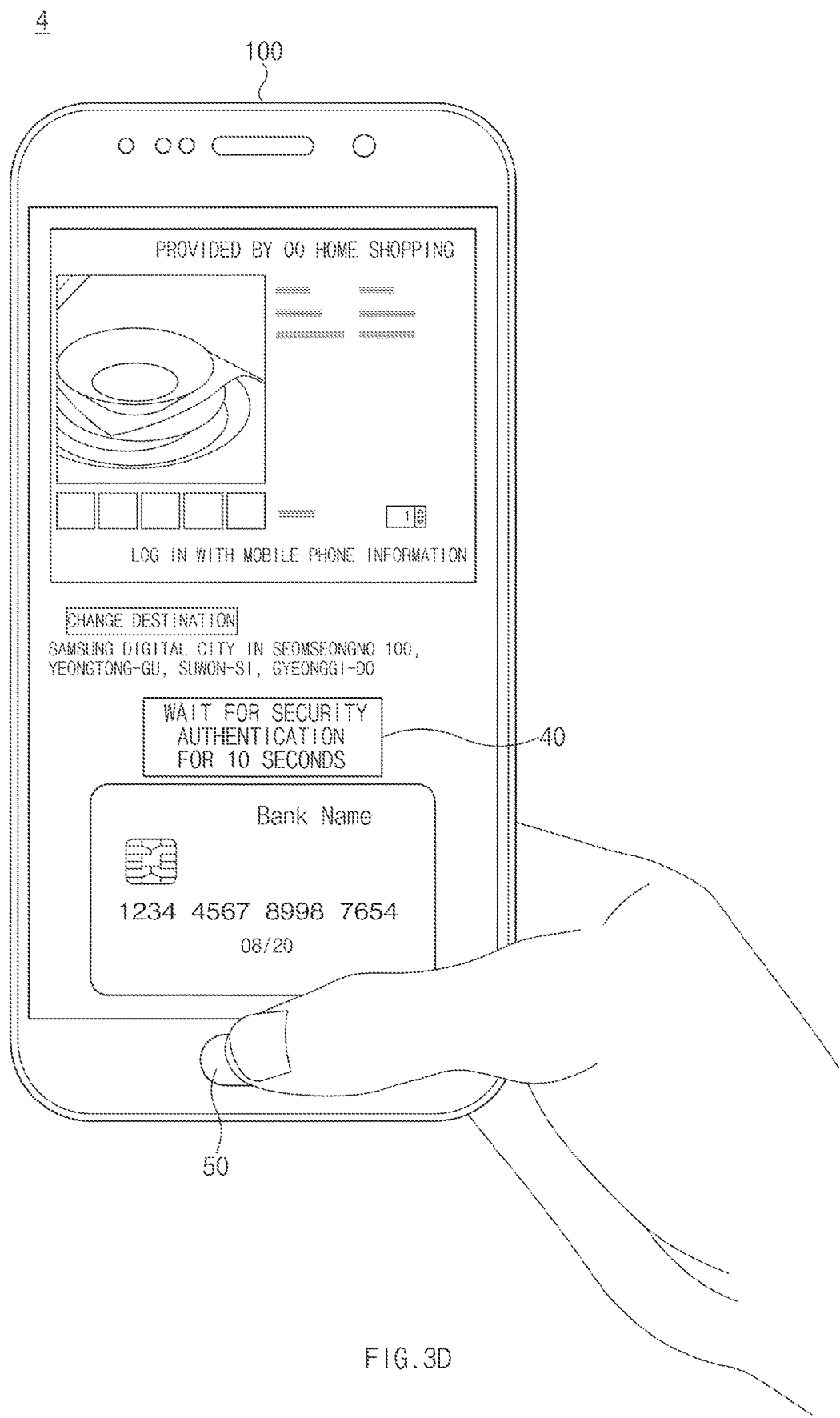
FIG. 3d is a drawing illustrating a fourth operation associated with executing an electronic payment application program according to an embodiment.

Referring to FIG. 3d, in operation 4, the second interface 30 may be converted into a third interface 40 associated with user authentication corresponding to the provided user input. The third interface 40 may include, for example, content (e.g., text) associated with an authentication limit time of the user. In an embodiment, if the third interface 40 is displayed, the user may provide a specified user input for user authentication. For example, the user may provide a user input (e.g., a touch hold) to a specified region (e.g., a home button region 50) on the electronic device 100. In response to a user input provided to the home button region 50, a security module 160 of FIG. 1a may activate a specified security platform (e.g., Knox) or a specified biometric system and may perform user authentication based on execution of the security platform or the biometric system.

Figure 4A:
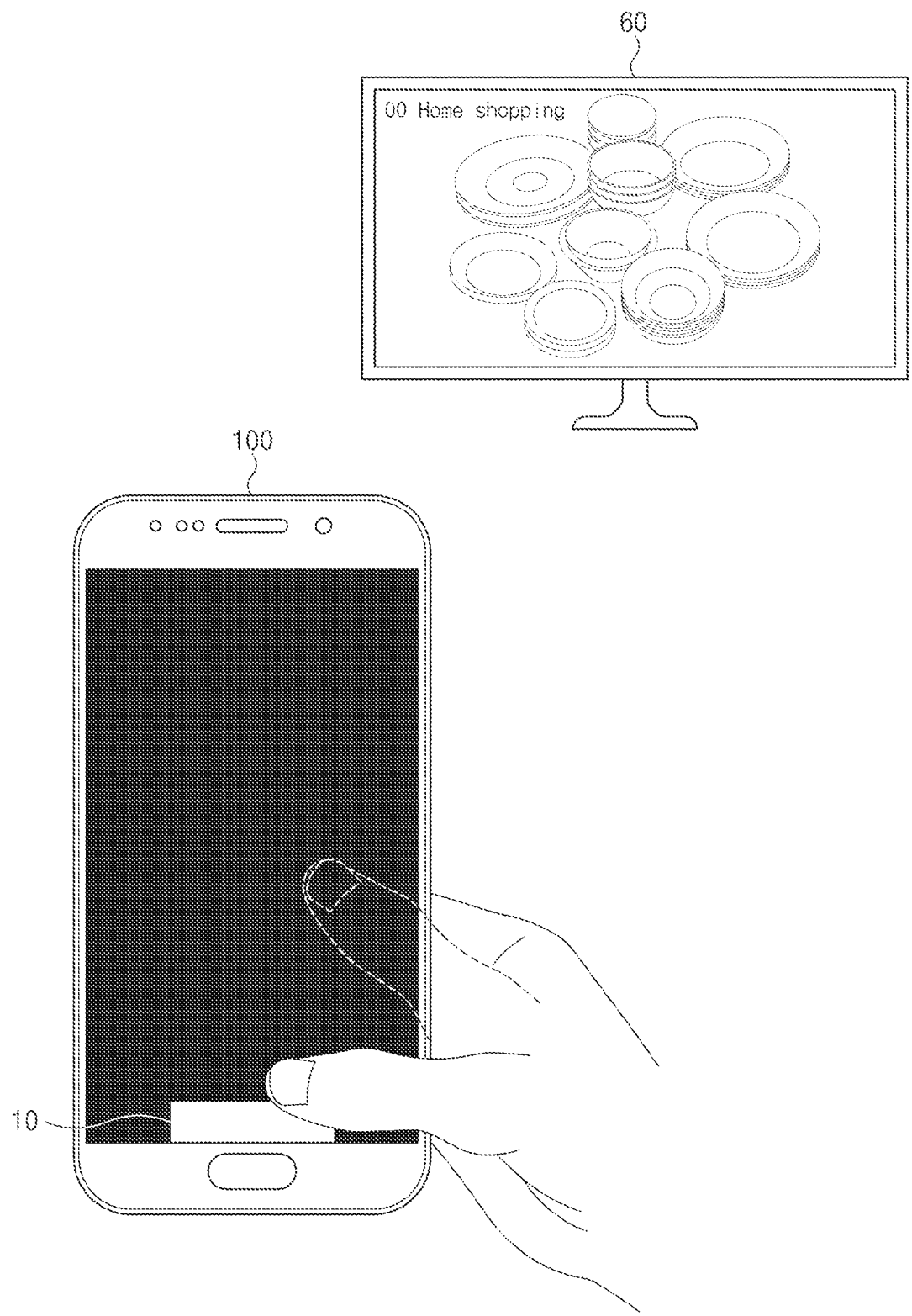
FIG. 4a is a drawing illustrating an example of an environment where an electronic device is operated, according to an embodiment.

FIG. 4a is a drawing illustrating an example of an environment where an electronic device is operated, according to an embodiment.

Referring to FIG. 4a, as a user holds at least part of an electronic device 100 or as at least part of a user's body is in contact with the electronic device 100, a sensor input module 120 of FIG. 1a may detect a change in physical quantity (e.g., a change in acceleration, tilt, pressure, temperature, or the like) which has an influence on the electronic device 100. If detecting the change in physical quantity to the electronic device 100, the sensor input module 120 may detect, for example, a sound signal originated from a device around the electronic device 100 or a sound signal generated within a specified distance range from the electronic device 100, based on a microphone module (not shown) mounted on the electronic device 100. For example, the sensor input module 120 may detect a sound signal of a broadcast (e.g., a home shopping) output on a media device 60 (e.g., a television (TV)) located to be adjacent to the electronic device 100 (or within a specified distance range). In an embodiment, the microphone module may be activated from a time when it detects the change in physical quantity to the electronic device 100 or may be in an always activated state (e.g., an always-on microphone state). The microphone module may detect a sound signal, generated within a specified distance range from the electronic device 100, in real time or at a specified period. In this case, the sensor input module 120 may variably adjust a period when a sound signal of the microphone module is detected, in response to, for example, a change in physical quantity to the electronic device 100. For example, if the change in physical quantity is greater than or equal to a specified level, the sensor input module 120 may set a period during which the sound signal is detected to be shorter than a reference period. If the change in physical quantity is less than the specified level, the sensor input module 120 may set the period during which the sound signal is detected to be longer than the reference period.

Figure 4B:
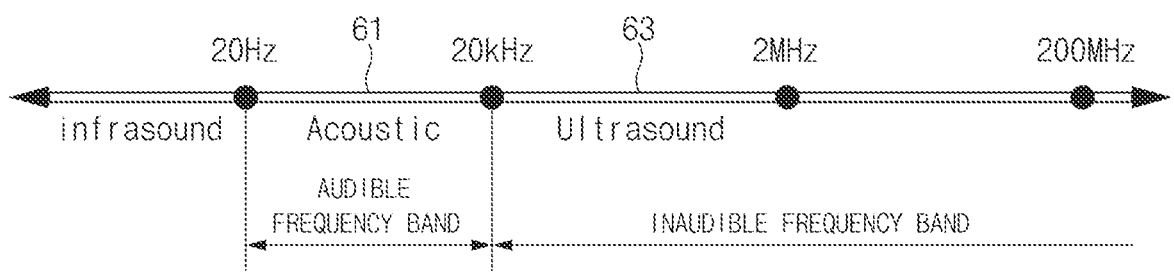
FIG. 4b is a drawing illustrating a frequency band associated with a sound signal according to an embodiment.
Figure 4C:
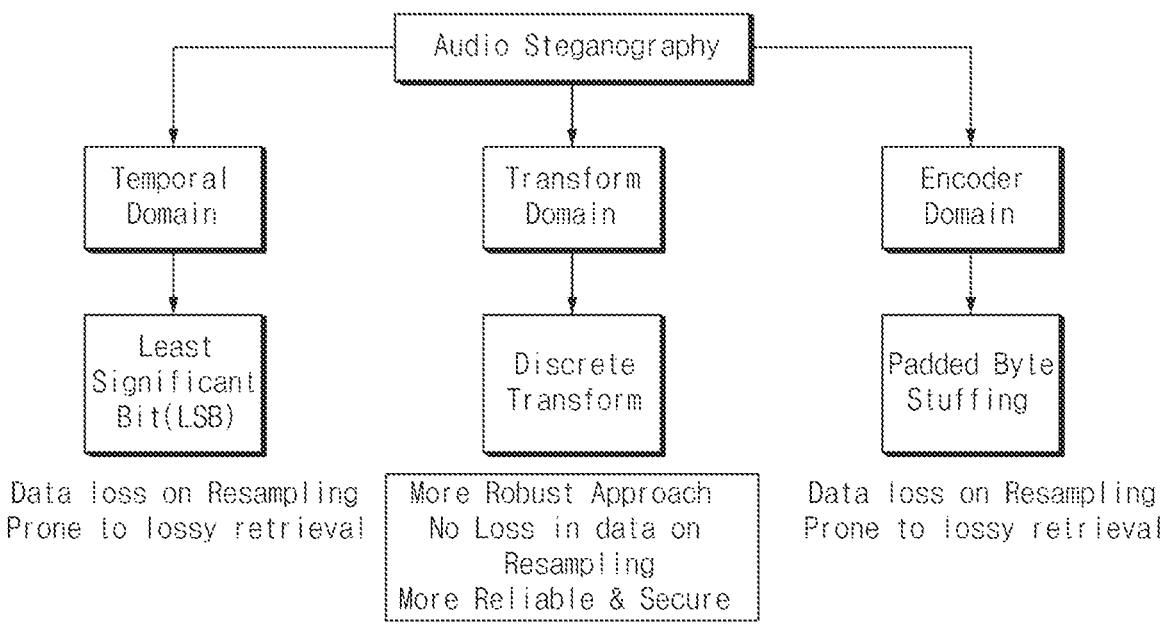
FIG. 4c is a drawing illustrating a method for inserting information into a sound signal according to an embodiment.
Figure 4D:
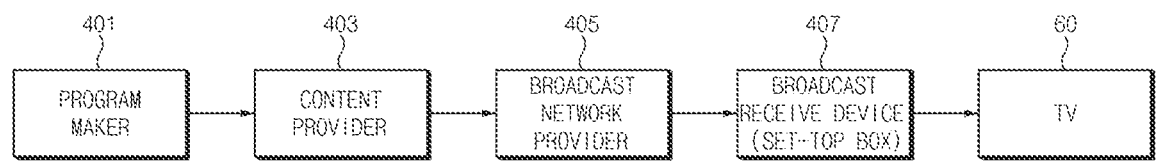
FIG. 4d is a drawing illustrating a form in which a broadcast service of a media device is received, according to an embodiment.

FIG. 4b is a drawing illustrating a frequency band associated with a sound signal according to an embodiment. FIG. 4c is a drawing illustrating a method for inserting information into a sound signal according to an embodiment. FIG. 4d is a drawing illustrating a form in which a broadcast service of a media device is received, according to an embodiment.

Referring to FIG. 4b, in an embodiment, a sound signal detected by a sensor input module 120 of FIG. 1a may be a signal of an audible frequency band 61 (e.g., 20 Hz to 20 kHz) or an ultrasound signal of an inaudible frequency band 63 (e.g., greater than 20 kHz). At least one of program information, channel information, or product information, broadcasted from, for example, a media device 60 of FIG. 4a, may be included in the signal of the audible frequency band 61 or the inaudible frequency band 63.

Referring to FIG. 4c, if a sound signal detected by the sensor input module 120 is a signal of the audible frequency band 61, at least one of the program information, the channel information, or the product information may be included in, for example, the signal of the audible frequency band 61 in the form of a specific bit pattern based on an audio watermark scheme. In this regard, the sensor input module 120 may include at least one program for extracting the bit pattern.

In various embodiments, the program information, the channel information, or the product information may be included in a signal of the inaudible frequency band 63 on a path where a broadcast service of the media device 60 is received. In this regard, referring to FIG. 4d, the media device 60 (e.g., a TV, an audio, or the like) may receive a broadcast service via at least one broadcast related provider or at least one broadcast device. For example, the media device 60 may receive a broadcast service through a route linked with at least one of a program maker 401, a content provider 403, a broadcast network provider 405, or a broadcast receive device 407 (or a set-top box). In this operation, the program information, the channel information, or the product information may be included in a signal of the inaudible frequency band 63 by at least one of the broadcast related provider or the broadcast device. The media device 60 may receive an ultrasound signal of the inaudible frequency band 63. In this regard, the sensor input module 120 may receive, for example, electronic program guide (EPG) information from the broadcast receive device 407. The sensor input module 120 may identify program information, channel information, or product information corresponding to a specific ultrasound signal of the inaudible frequency band 63 or a current time based on the EGP information.

Figure 4E:
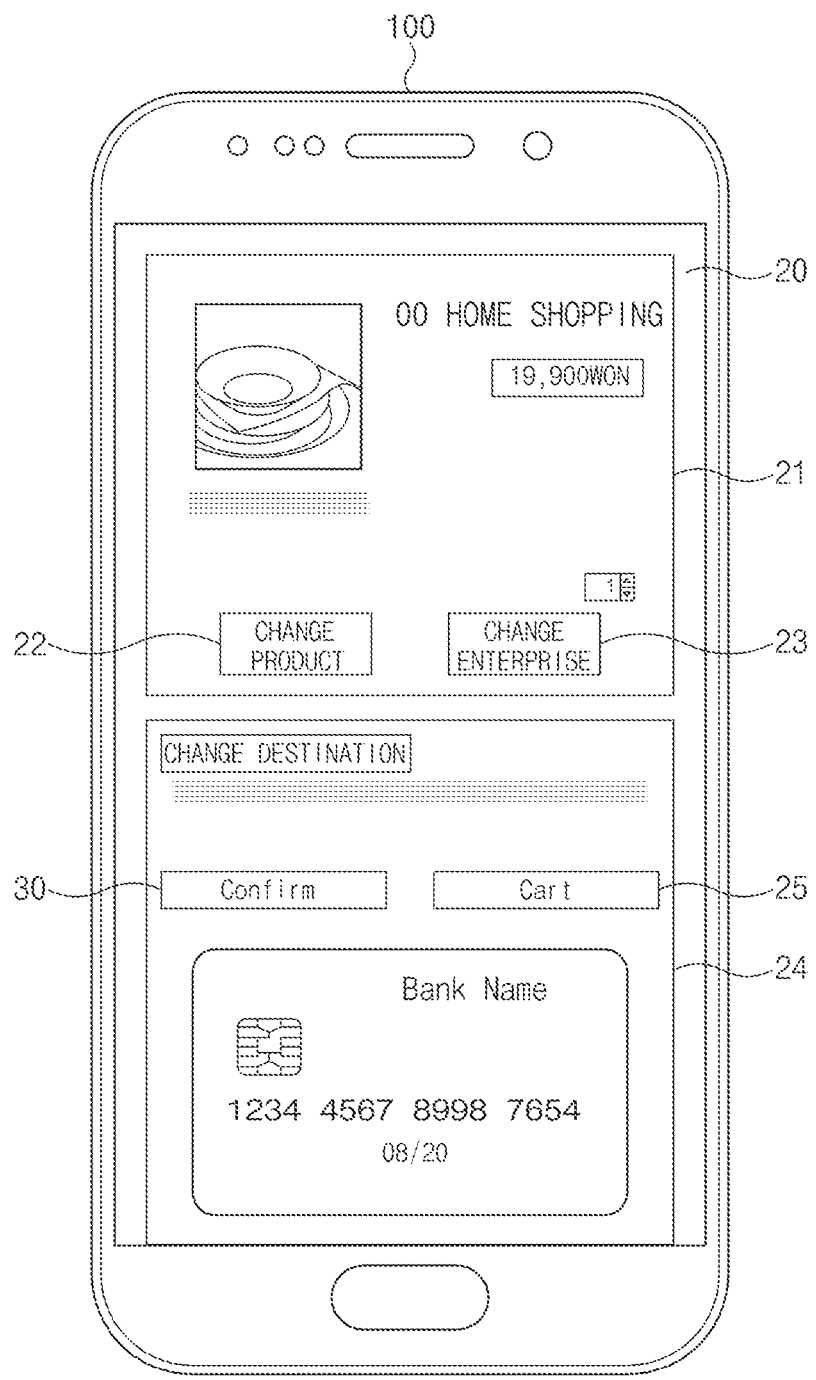
FIG. 4e is a drawing illustrating a form of a user interface (UI) according to an embodiment.
Figure 4F:
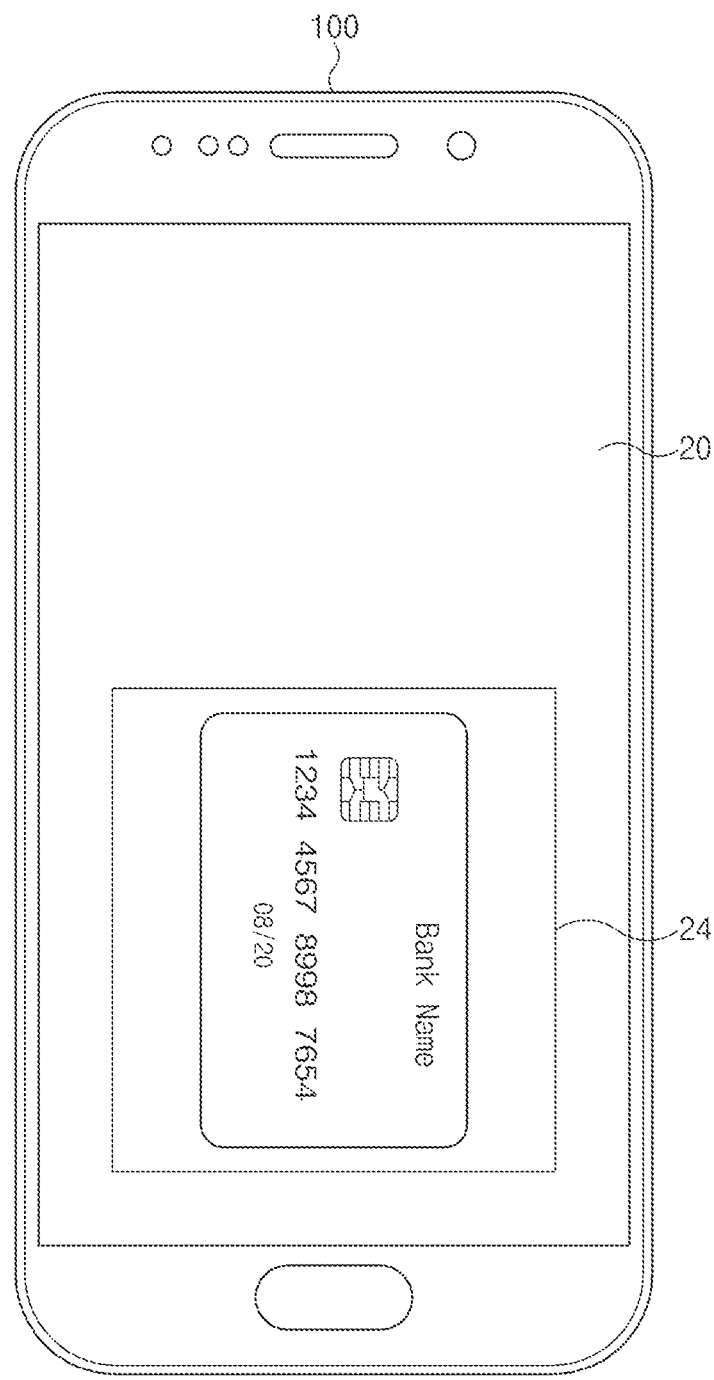
FIG. 4f is a drawing illustrating another form of a UI according to an embodiment.
Figure 4G:
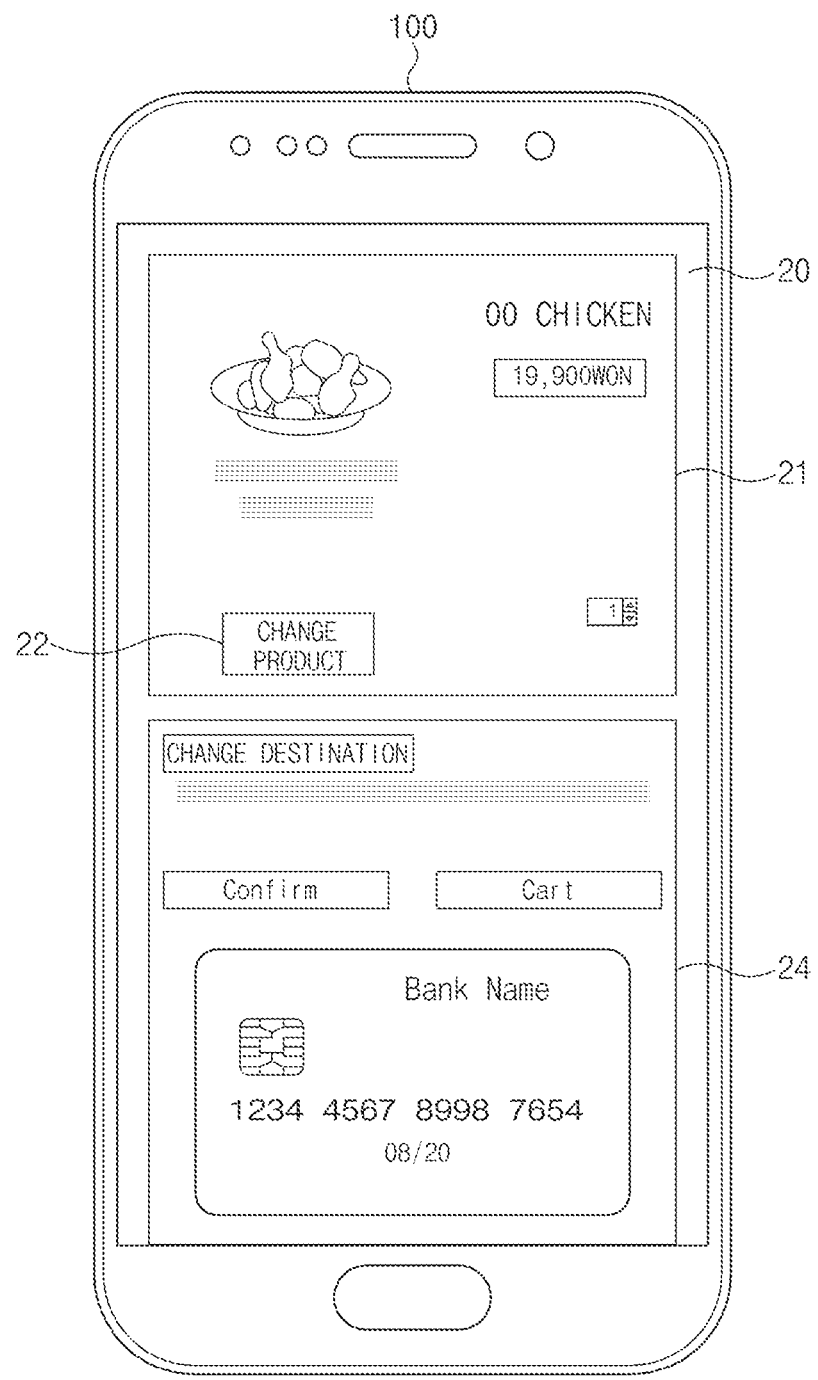
FIG. 4g is a drawing illustrating another form of a UI according to an embodiment.

FIGS. 4e to 4g are drawings illustrating various forms of a UI according to an embodiment.

Referring again to FIG. 4a, a sensor input module 120 of FIG. 1a may detect a sound signal of a broadcast output from a media device 60 of FIG. 4a, located to be adjacent to an electronic device 100 (or within a specified distance range) and may transmit information about the detected sound signal to a smart payment engine 130 of FIG. 1a.

Meanwhile, the smart payment engine 130 may determine, for example, a specific DB from a memory module 110 of FIG. 1a based on location information of the electronic device 100. Alternatively, the smart payment engine 130 may identify a language (e.g., a word, a phrase, a morpheme, or the like) included in information about the sound signal transmitted from the sensor input module 120 and may determine a specific DB including product information corresponding to the language. The smart payment engine 130 may extract product information corresponding to information about the sound information from the determined specific DB. The smart payment engine 130 may determine at least one product according to the extracted product information as a product (e.g., a bowl) promoted in a broadcast (e.g., a home shopping) output from the media device 60 to determine the product as a product to perform electronic payment.

Referring to FIG. 4e, a UI generator module 140 of the electronic device 100 may generate a UI 20 associated with operating an electronic payment function of the electronic device 100, based on information about a product to perform electronic payment, transmitted from the smart payment engine 130, and payment information transmitted from a payment module 150. If a user input (e.g., swipe) is provided on an interface 10 of FIG. 3b displayed on a display screen region 142 of the electronic device 100 (e.g., a lower end of the display screen region 142), the UI 20 may configure at least part of a screen where an electronic payment application program is executed.

In an embodiment, the UI 20 may include information 21 about a product (e.g., a bowl) to perform electronic payment and payment information 24 associated with processing a price of the product. The UI 20 may further include at least one interface 22, 23, 25, 30, or the like. For example, the UI 20 may include the interface 22 for supporting to search for another product promoted in a broadcast (e.g., a home shopping) by the media device 60, the interface 23 for supporting to search for another enterprise which handles a product (e.g., a bowl) to perform electronic payment, the interface 25 of a function of temporarily storing information about the product to perform the electronic payment, the interface 30 for receiving a user input (e.g., a touch) associated with payment approval, or the like.

In connection with the interface 23 which supports to search for the other enterprise, at least one external device (e.g., a device operated at an enterprise which sells a product) may provide, for example, information (e.g., URL information) of a product site operated at the enterprise based on a network established with the electronic device 100. The electronic device 100 may store the product site information provided form at least one external device in a DB and may support to be linked to at least one product site with reference to the DB if a user input (e.g., a touch) is provided on the interface 23 for searching for the enterprise.

Referring to FIG. 4*f*, in an embodiment, the UI generator module 140 may generate the UI 20 including only the payment information 24 (e.g., information about a debit card or a credit card). For example, if the sensor input module 120 does not clearly detect a sound signal originated from the media device 60 or if the sensor input module 120 does not determine a product to pay since there is no program information, channel information, or product information, broadcasted from the media device 60, in the sound signal, the UI generator module 140 may generate the UI 20 including only the payment information 24. Alternatively, if the smart payment engine 130 does not determine a product to pay since there is no product information corresponding to information about the sound signal on a DB of the memory module 110, the UI generator module 140 may generate the UI 20 including only the payment information 24. In this operation, if a user input (e.g., a touch hold) is provided on a specified region (e.g., a home button region 50 of FIG. 3*d*) of the electronic device 100, a security platform (e.g., Knox) or a biometric system by a security module 160 of FIG. 1*a* may be activated and an offline payment system of a payment module 150 of FIG. 1*a* may be activated.

In another embodiment, if a product to pay is not determined based on a sound signal sensed by the sensor input module 120, the smart payment engine 130 may transmit information about a basic product to the UI generator module 140. For example, the smart payment engine 130 may combine at least one information (e.g., location information of the electronic device 100, current time information, surfing information of a user, product purchase history information, or the like) obtained through another element (e.g., the memory module 110, the sensor input module 120, the security module 160, or the like) to determine the basic product. Referring to FIG. 4*g*, for example, if a time when a sound signal originated from the media device 60 is midnight and if there is late-night snack search information of a user as history in the memory module 110, the smart payment engine 130 may determine at least one food (e.g., a food according to late-night snack of the user) as the basic product and may transmit product information of the food to the UI generator module 140. The UI generator module 140 may generate the UI 20 including basic product information 21 and the payment information 24 based on at least one product information (e.g., food information) transmitted from the smart payment engine 130 and payment information transmitted from the payment module 150. In various embodiments, the UI 20 including the basic product information 21 may include the interface 22 for supporting to search for at least one product information (e.g., food information) transmitted from the smart payment engine 130.

Figure 5:
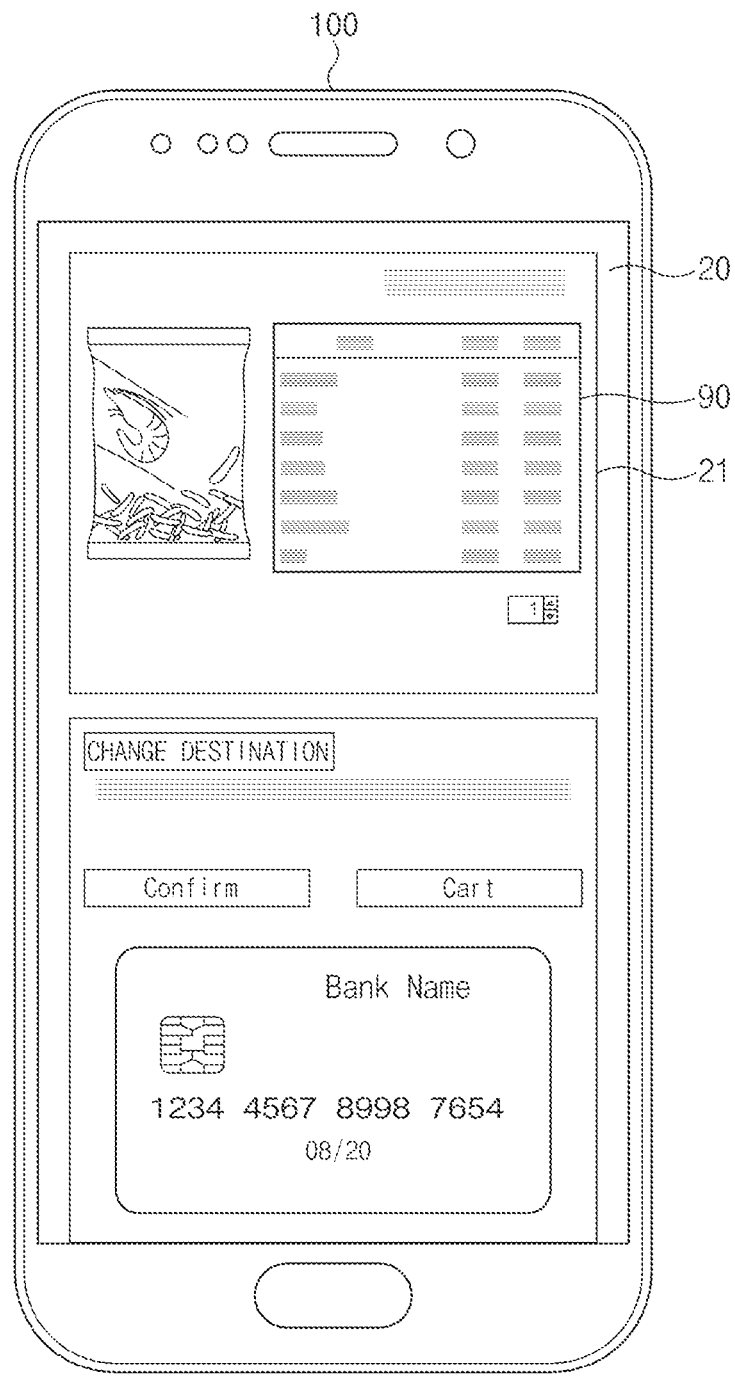
FIG. 5 is a drawing illustrating a form of a UI according to another embodiment.
Figure 6:
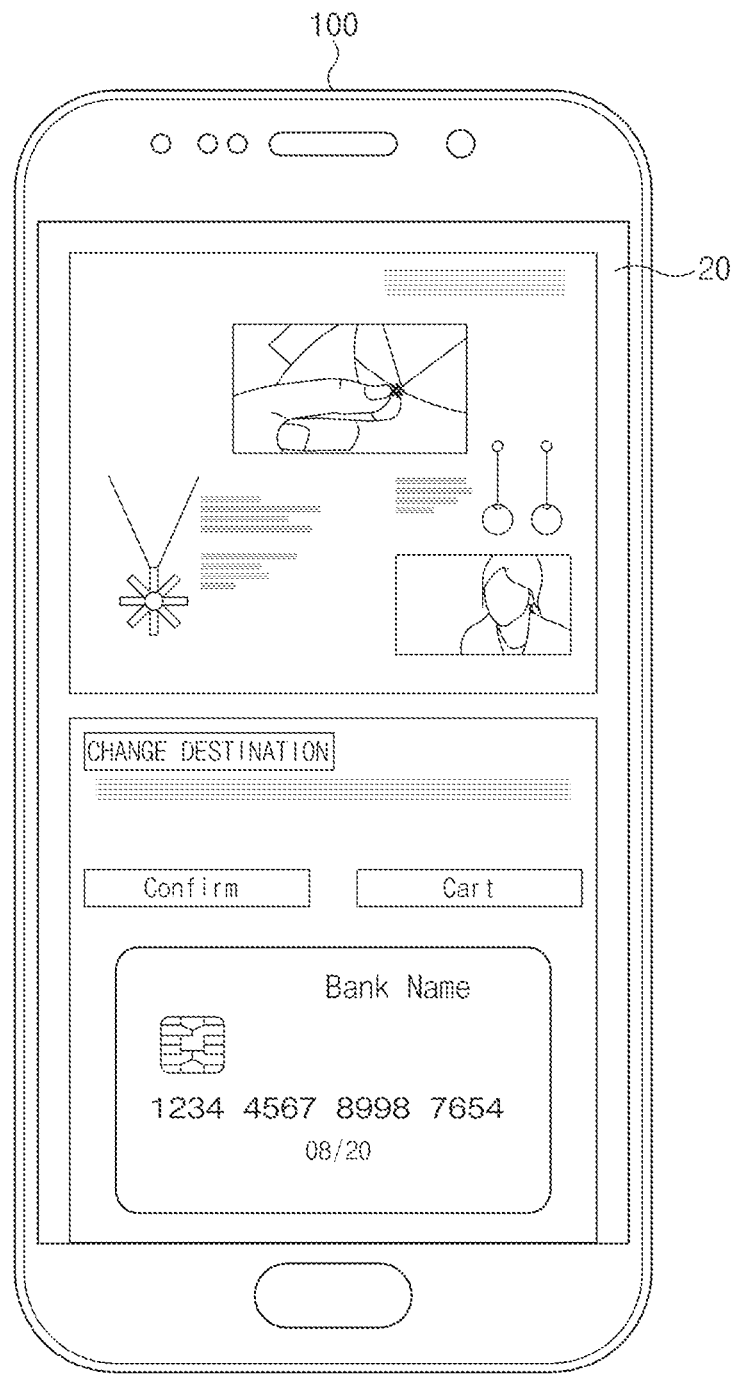
FIG. 6 is a drawing illustrating a form of a UI according to another embodiment.

FIG. 5 is a drawing illustrating a form of a UI according to another embodiment. FIG. 6 is a drawing illustrating a form of a UI according to another embodiment.

In various embodiments, a sensor input module 120 of FIG. 1*a* may detect a sound signal from various media platforms. For example, the sensor input module 120 may detect a sound signal from an acoustic sound output from an audio or TV other than the above-mentioned broadcast program (e.g., a home shopping) and may determine a product corresponding to the sound signal, thus transmitting information about the determined product to a UI generator module 140 of FIG. 1*a*. In this regard, the sensor input module 120 may determine a product corresponding to the sound signal with reference to program information, channel information, or product information included in the sound signal and EPG information received from a broadcast receive device 407 (e.g., a set-top box) of FIG. 4*d*. Alternatively, the sensor input module 120 may determine a product by recognizing the voice itself included in the sound signal or may determine a product by converting the voice into text and comparing the converted text with at least one product information stored in a memory module 110 of FIG. 1*a*.

In connection with the above-mentioned contents, referring to FIG. 5, an interface 90 including information, such as at least one store or selling price, associated with an advertised product may be included on a UI 20 including product information 21 about the advertised product. In various embodiments, determining a product to pay based on sensing a sound signal of the sensor input module 120 may also be applied to, for example, a product placement (PPL) product included in a broadcast (e.g., a drama) output from a media device 60 of FIG. 4*a*. The sensor input module 120 may support to extract PPL product information in a sound signal originated from a drama broadcast and generate, for example, the UI 20 shown in FIG. 6. In an embodiment, at least one content (e.g., an image, a video, or the like) associated with the drama broadcast as well as the PPL product information and payment information may be included on the UI 20.

Figure 7A:
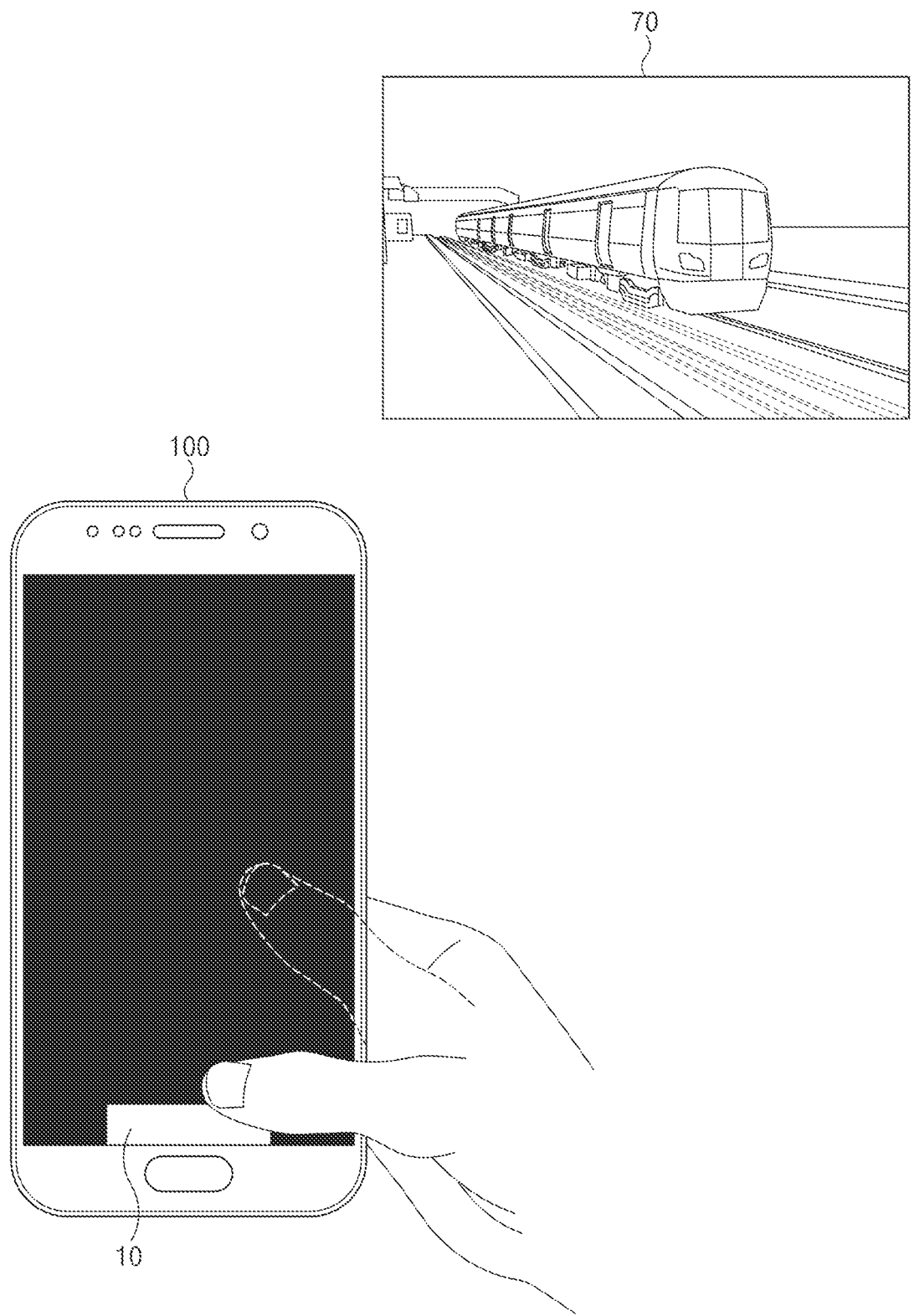
FIG. 7a is a drawing illustrating an example of an environment where an electronic device is operated, according to another embodiment.
Figure 7B:
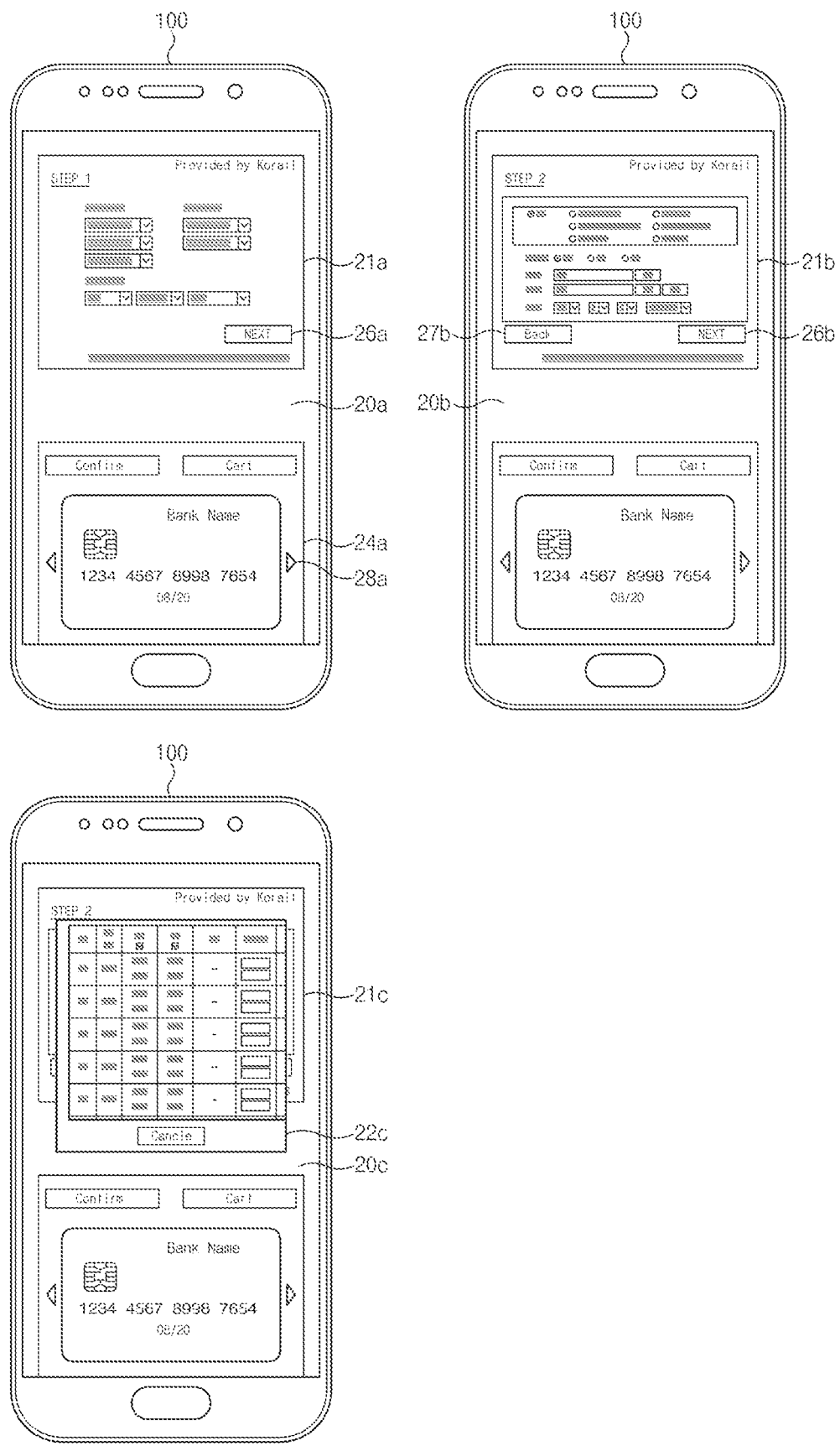
FIG. 7b is a drawing illustrating a form of a UI according to another embodiment.

FIG. 7*a* is a drawing illustrating an example of an environment where an electronic device is operated, according to another embodiment. FIG. 7*b* is a drawing illustrating a form of a UI according to another embodiment.

Referring to FIG. 7*a*, a sensor input module 120 of FIG. 1*a* according to an embodiment may detect a location of an electronic device 100 based on a geomagnetic sensor or a GPS module. In this case, a smart payment engine 130 of FIG. 1*a* may identify at least one landmark which exists within a specified distance range (or a specified region range) from the electronic device 100 based on location information of the electronic device 100. In this regard, the smart payment engine 130 may use map information stored in a memory module 110 of FIG. 1*a*. Alternatively, the smart payment engine 130 may provide current location information of the electronic device 100 to an external server which provides map information to request the external server to transmit at least one landmark information within a constant distance range (or a constant range) with respect to the current location.

In an embodiment, the smart payment engine 130 may determine a landmark most adjacent to the electronic device 100 and may determine a produce associated with the landmark as a product to perform electronic payment of the electronic device 100. For example, if the electronic device 100 is located to be adjacent to a train station 70, the smart payment engine 130 may determine a product (e.g., a train ticket) sold at the train station 70 as a product to perform electronic payment. The smart payment engine 130 may access a server operated by the train station 70 and may request the server to transmit information about a product (e.g., a train ticket) to download (or stream) the information. Similarly or relatively, the smart payment engine 130 may determine a ticket according to an amusement park, a movie ticket according to a movie theater, an airline ticket according an airport, or the like as a product to perform electronic payment based on location information of the electronic device 100 and may receive product information or a web page associated with product purchase from a server operated by a corresponding landmark.

Referring to FIG. 7*b*, a UI generator module 140 of FIG. 1*a* may generate a UI 20*a* including information 21*a* about a product (e.g., a train ticket) transmitted from the smart payment engine 130 and payment information 24*a* transmitted from a payment module 150 of FIG. 1*a*. In an embodiment, the UI 20*a* generated by a function operation of the UI generator module 140 may be configured to facilitate screen shift for product information 21*a*. In this regard, an interface 26*a* for supporting a screen shift for the product information 21*a* (e.g., a screen shift for writing a variety of information or selecting information, accompanied with product purchase) may be included in one region of the UI 20*a*. In an embodiment, if a plurality of information about a debit card or a credit card of a user name are stored in a specified security area (e.g., a trust zone) of the electronic device 100, an interface 28*a* for supporting a screen shift for payment information 24*a* (e.g., a screen shift for selecting a card to pay for a product) may be included on the UI 20*a*.

As an example for the above-mentioned contents, if a user input (e.g., a touch) is provided to the interface 26*a* for supporting a screen shift of the product information 21*a*, the UI generator module 140 may generate a UI 20*b* including product information 21*b* according the screen shift. The UI 20*b* may include an interface 26*b* for supporting another screen shift for the product information 21*b* or an interface 27*b* for supporting a shift to a previous screen for the product information 21*b*. According to an embodiment, in response to a user input provided to the interfaces 26*a* and 26*b* for supporting the screen shift, a UI 20*c* including last product information 21*c* may be output. An interface 22*c* for providing detailed information of selected content may be overlapped on the UI 20*c* in response to, for example, a user input (e.g., a touch) for selecting any content included in the last product information 21*c*. If a user input (e.g., swipe) is provided on an interface 10 of FIG. 3*b*, displayed on a display screen region 142 of FIG. 3*b* (e.g., a lower end of the display screen region 142) of the electronic device 100, the at least one UI 20*a*, 20*b*, and/or 20*c* may configure at least part of a screen where an executed electronic payment application program is executed.

Figure 8A:
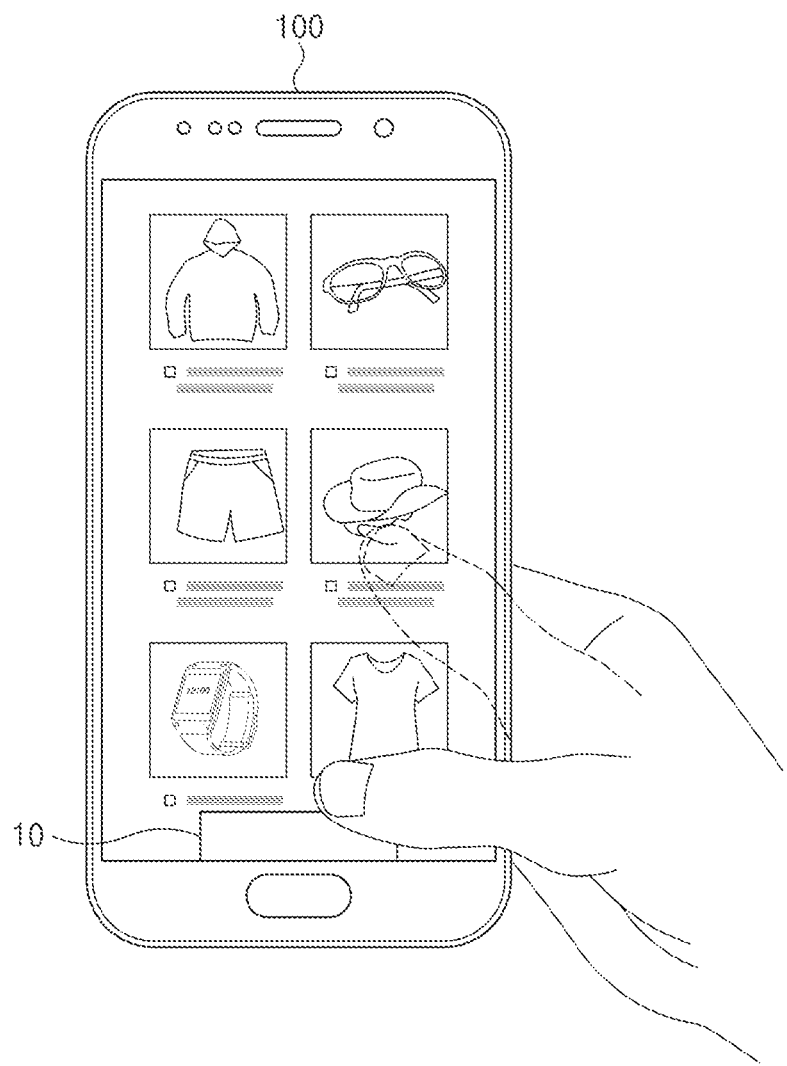
FIG. 8a is a drawing illustrating an example of an environment where an electronic device is operated, according to another embodiment.
Figure 8B:
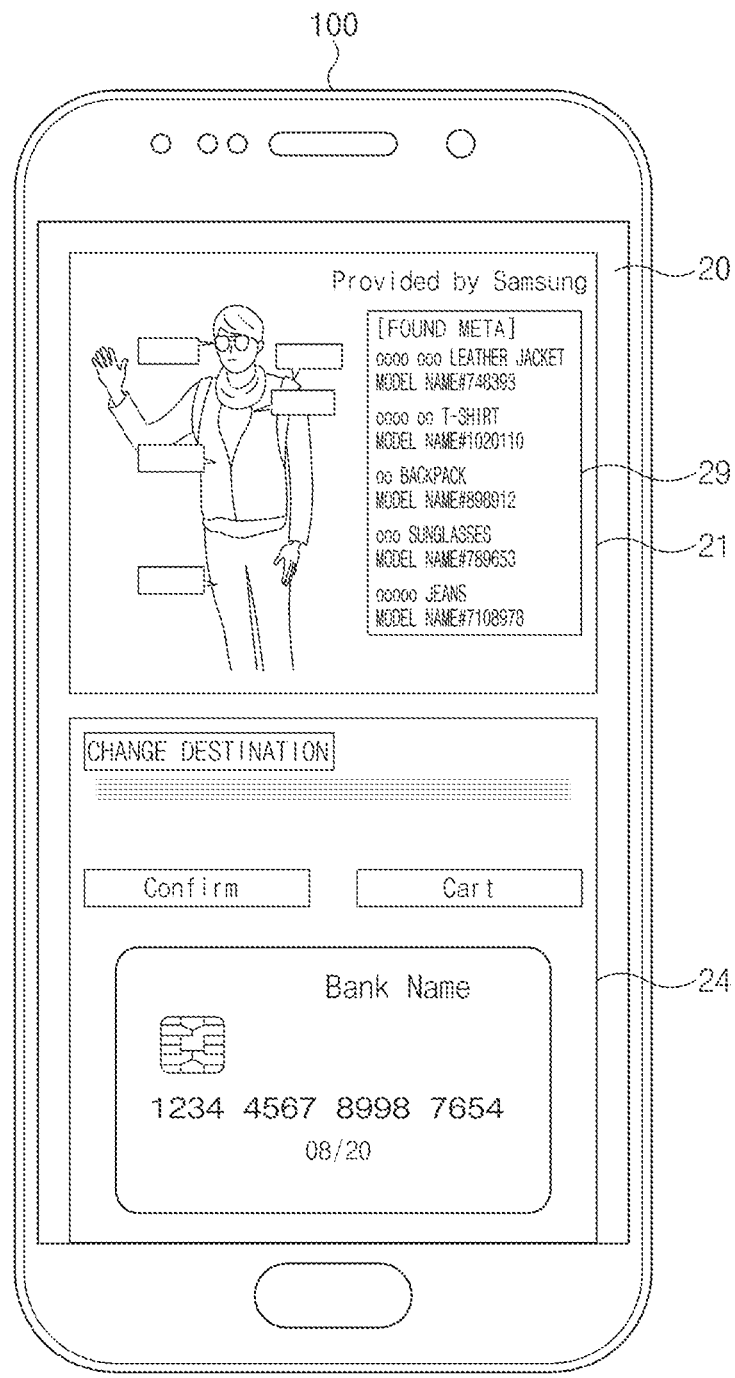
FIG. 8b is a drawing illustrating a form of a UI according to another embodiment.

FIG. 8*a* is a drawing illustrating an example of an environment where an electronic device is operated, according to another embodiment. FIG. 8*b* is a drawing illustrating a form of a UI according to another embodiment.

Referring to FIG. 8*a*, a sensor input module 120 of FIG. 1*a* may detect, for example, tag information, meta information, or parsing information associated with a screen where a web browser application program is executed. For example, if a user provides a direct input (e.g., a touch hold input or a touch input using a user's body) or an indirect input (e.g., a click using a mouse pointer) on any content (e.g., an image, a video, text, an icon, or the like associated with a product) on a web page associated with a social commerce, the sensor input module 120 may obtain tag information, meta information, or parsing information associated with the content and may transmit the obtained information to a smart payment engine 130 of FIG. 1*a*. In this operation, if an electronic payment application program is executed (or if a UI (e.g., swipe) is provided on an interface 10), a web browser application program associated with the web page may be converted into an inactive state (e.g., a background state). The smart payment engine 130 may determine a product according to tag information, meta information, or parsing information as a product to perform electronic payment and may identify product information corresponding to the tag information, the meta information, or the parsing information based on a DB of a memory module 110 of FIG. 1*a*. In various embodiments, the sensor input module 120 may detect or obtain only tag information, meta information, or parsing information encrypted or authenticated by a mutual protocol.

Alternatively, the smart payment engine 130 may request a server associated with the social commerce (or a server of another social commerce which handles content (or a product) selected from a user) to transmit product information corresponding to tab information, meta information, or parsing information according to content selection of the user. In various embodiments, the sensor input module 120 may detect an object for content to which a user input is provided on the web page based on image analysis. The sensor input module 120 may extract product information corresponding to the object with reference to a DB of the memory module 110, or may request a server associated with the social commerce to transmit product information corresponding to an object and may receive the product information.

Referring to FIG. 8*b*, a UI generator module 140 of FIG. 1*a* may generate a UI 20 including product information 21 according to tag information, meta information, or parsing information transmitted from the smart payment engine 130 and payment information 24 transmitted from a payment module 150 of FIG. 1*a*. In an embodiment, a list 29 of at least one product corresponding to detected tag information, meta information, or parsing information may be included in one region of the UI 20.

In various embodiments, the sensor input module 120 may detect, for example, an object which exists on a region around the electronic device 100 based on a camera module (not shown) mounted on the electronic device 100. The sensor input module 120 may transmit image or video data for the detected object to the smart payment engine 130. The smart payment engine 130 may perform image analysis for the image or video to detect an object and may determine the detected object as a product to perform electronic payment. The smart payment engine 130 may extract product information corresponding to the object from a DB of the memory module 110 based on information such as a shape (or a contour) of the detected object or a logo included in the object. Alternatively, the smart payment engine 130 may request a server which handles the detected object (e.g., a server operated by a social commerce platform or an online selling website) to download (or stream) the product information.

In various embodiments, the sensor input module 120 may detect an infrared bar code or a QR code through the camera module. In this case, the smart payment engine 130 may determine a product to perform electronic payment based on reading a bar code or a QR code by the sensor input module 120 and may receive information about a product corresponding to the infrared bar code or the QR code.

In various embodiments, information associated with an environment where the electronic device 100 is operated may be limited to the sound, the location, the object, the bar code, the QR code, the tag information, the meta information, or the parsing information and may include a variety of information as long as detection by the sensor input module 120 is implemented. For example, the sensor input module 120 may detect temperature according to an environment where the electronic device 100 is operated. The smart payment engine 130 may obtain product information corresponding to the detected temperature from a platform associated with temperature, weather, a season, or the like. For example, the smart payment engine 130 may collect or obtain clothing product information (e.g., summer clothing, winter clothing, or the like) from the memory module 110 or an external server depending on temperature information or may collect or obtain season food information (e.g., a summer food, a winter food, or the like) according to the temperature information.

For another example, the sensor input module 120 may detect scheduling information stored in a specific application program (e.g., a calendar, a timepiece, a memo pad, navigation, or the like) in the electronic device 100 at a specified date or in a time range. The smart payment engine 130 may obtain product information corresponding to the detected scheduling information. For another example, the electronic device 100 may act as a proxy in a product payment function of an external device which interacts based on a network, an external device linked with the electronic device 100 using the same account information, or an external device in which mutual authentication with the electronic device 100 is completed to process the product payment function. For example, the electronic device 100 may receive information, such as the sound, the location, the object, the bar code, the QR code, the tag information, meta information, parsing information, or temperature information, from the external device and may transmit the received information to the smart payment engine 130. The smart payment engine 130 may extract product information corresponding to at least one information transmitted information with reference to a DB of the memory module 110 or may obtain product from a server associated with the information.

Figure 9:
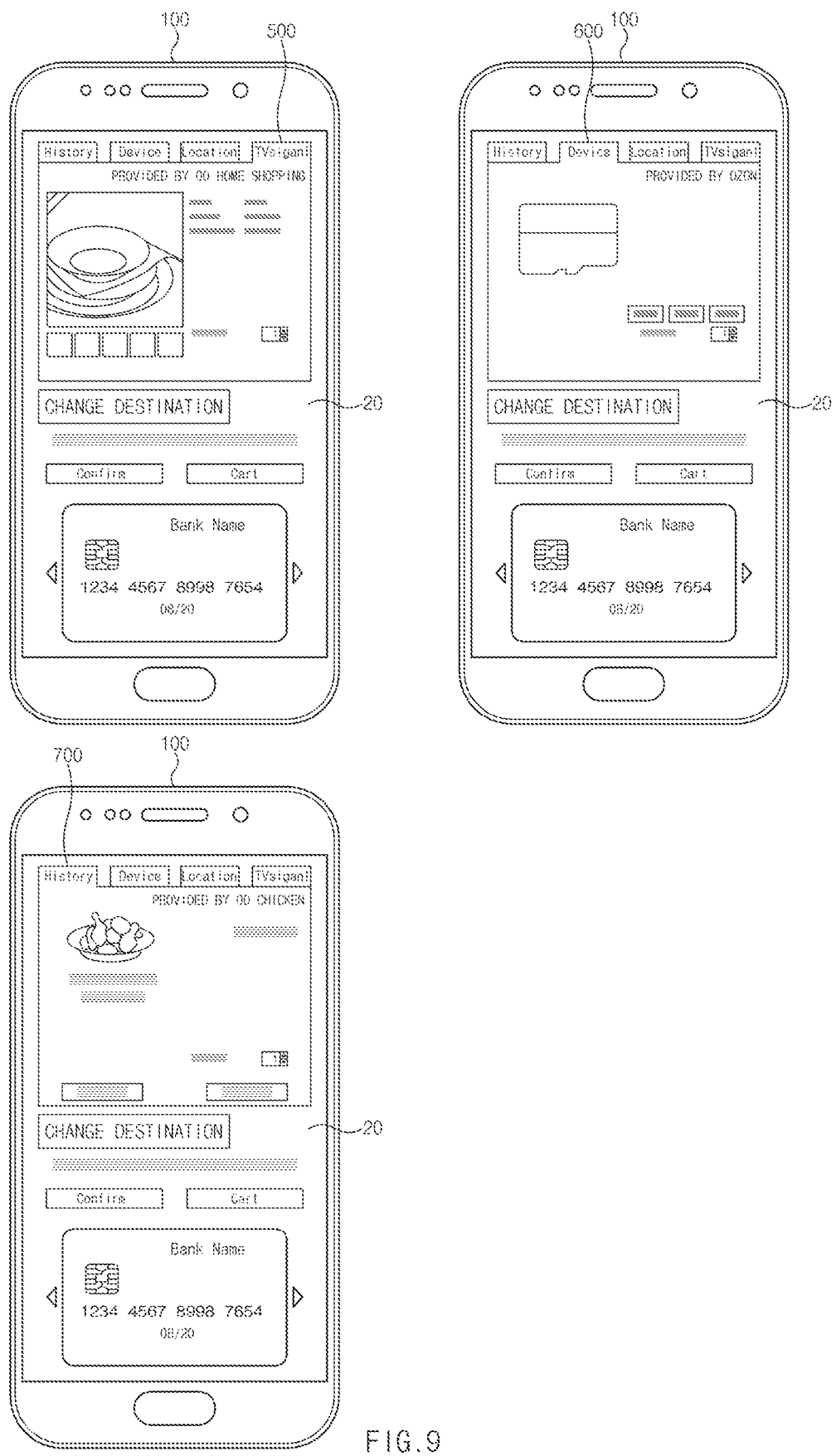
FIG. 9 is a drawing illustrating a form of a UI according to another embodiment.

FIG. 9 is a drawing illustrating a form of a UI according to another embodiment.

Referring to FIG. 9, in an embodiment, a sensor input module 120 of FIG. 1*a* may detect, obtain, or read a plurality of information associated with an environment where an electronic device 100 is operated. The plurality of detected information may be transmitted to a smart payment engine 130 of FIG. 1*a*. The smart payment engine 130 may determine a plurality of products to perform electronic payment, corresponding to each of the plurality of information. In this case, a plurality of product information may be included on a UI 20 generated by a UI generator module 140 of FIG. 1*a*. For example, a plurality of product information may be displayed on each of a plurality of sections changed through a tap 500, 600, and/or 700 on the UI 20. The tap 500, 600, and/or 700 may support to classify a category for information detected, obtained, or read by the sensor input module 120 (e.g., user history, an external device which interacts with the electronic device 100, a location of the electronic device 100, a media device which originates a sound signal, or the like). If a user input is provided to the tap 500, 600, and/or 700, a change to a corresponding section is performed and corresponding product information may be displayed.

In an embodiment, the smart payment engine 130 may assign different weights to a plurality of determined products to perform electronic payment. For example, the smart payment engine 130 may assign a high weight to a product corresponding to information relatively late detected, obtained, or read among a plurality of information associated with an environment where the electronic device 100 is operated. The UI generator module 140 may receive information about a plurality of products to which different weights are assigned from the smart payment engine 130 and may include product information with a high weight in a section initially displayed (or located on the uppermost layer) among a plurality of sections on the UI 20.

Figure 10A:
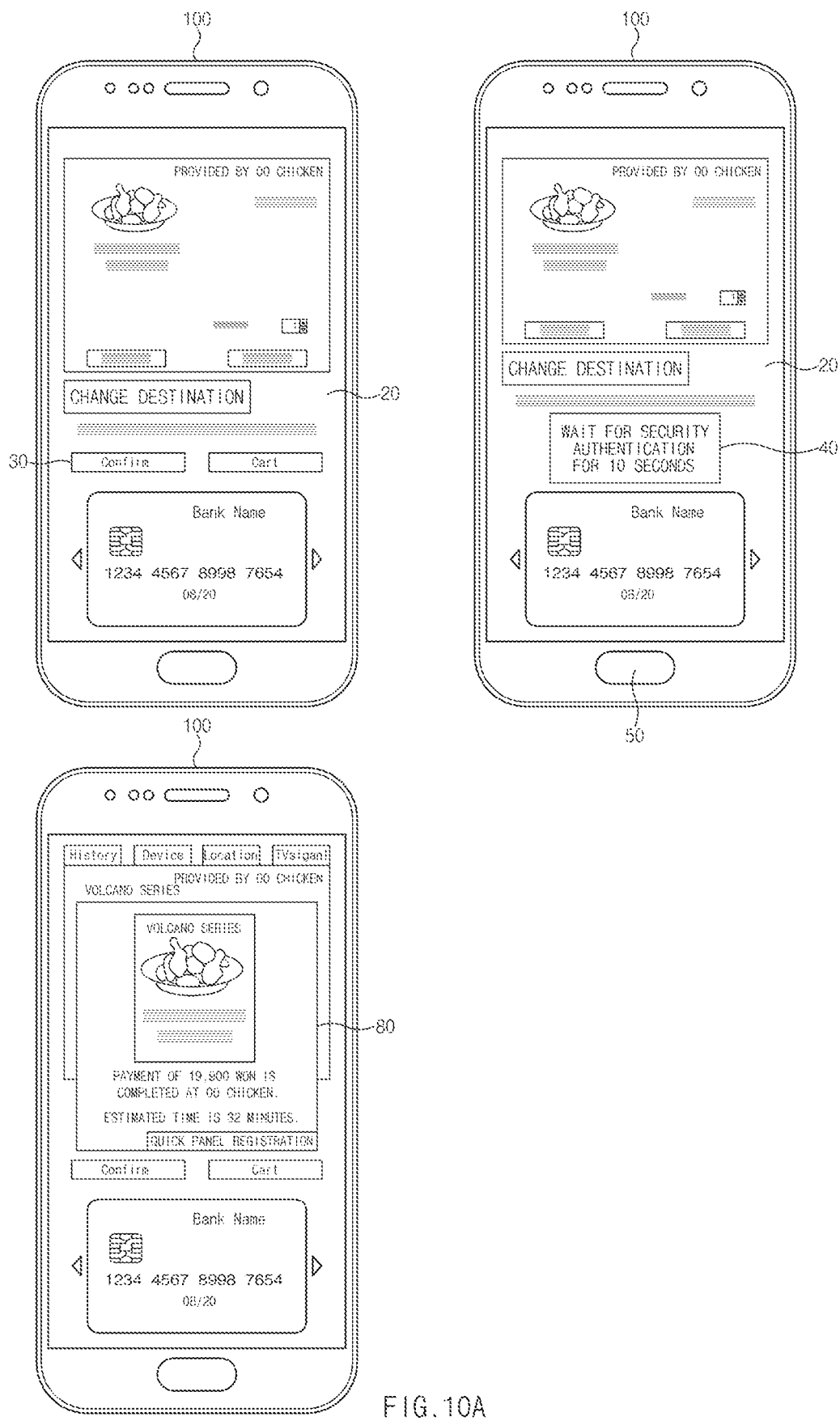
FIG. 10a is a drawing illustrating a form in which a function of a payment mode is performed, according to an embodiment.
Figure 10B:
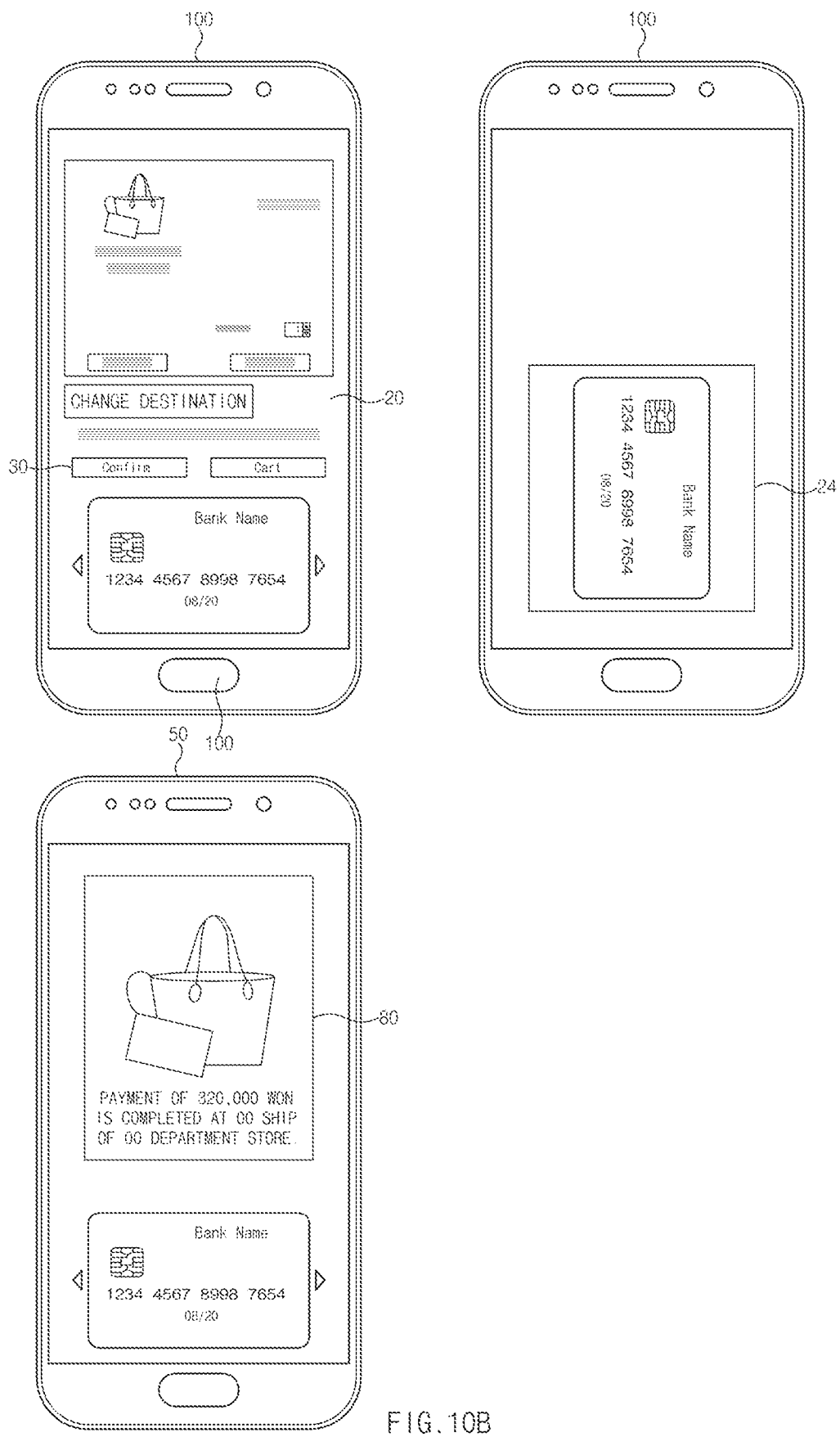
FIG. 10b is a drawing illustrating a form in which a function of a payment mode is performed, according to another embodiment.

FIG. 10*a* is a drawing illustrating a form in which a function of a payment mode is performed, according to an embodiment. FIG. 10*b* is a drawing illustrating a form in which a function of a payment mode is performed, according to another embodiment.

According to an embodiment, according to a user input (e.g., a touch) provided to one region of an electronic device 100 or one region of a UI 20, a payment module 150 of FIG. 1*a* may process a price of a product to perform electronic payment, determined by a smart payment engine 130 of FIG. 1*a* or may process a price of any offline product.

Referring to FIG. 10*a*, the payment module 150 may start to pay for a product to pay, based on a user input provided on the UI 20. For example, if a UI (e.g., a touch) is provided on an interface 30 associated with payment approval of the product, the payment module 150 may start to pay for the product. In an embodiment, if the user input (e.g., a touch) is released, the interface 30 associated with the payment approval may be converted into an interface 40 associated with user authentication. In this operation, if a user input is provided on a specified region (e.g., a region corresponding to a home button 50) of the electronic device 100, a specified security platform or a specified biometric system may be activated. If user authentication is completed according to execution of the security platform or the biometric system, the payment module 150 may transmit purchase information including product information and payment information to an external device or an external server which approves payment of the product. If a response associated with payment approval is received from the external device or the external server, the payment module 150 may complete product payment. In an embodiment, a UI generator module 140 of FIG. 1*a* may generate an interface 80 including a message or an electronic receipt associated with a payment approval response received from the external device or the external server.

Referring to FIG. 10*b*, before a user input (e.g., a touch) is provided on an interface 30 for supporting payment approval on the UI 20, if a user input is previously provided on the region corresponding to the home button 50, an offline payment function of the payment module 150 may be activated. The UI generator module 140 may generate and output the UI 20 including only payment information 24, in response to activation of the offline payment function. If the electronic device 100 which displays the payment information 24 is close to a specified external device (e.g., a point of sales (POS) device), the payment module 150 may transmit purchase information to the external device based on a magnetic secure transmission (MST) scheme or a near field communication (NFC) scheme. If a payment approval response is received from the external device, the UI generator module 140 may generate and output an interface 80 including a message or an electronic receipt.

An electronic device according to various embodiments may include a memory configured to store at least one first information provided from an external server in connection with operating electronic payment, a display configured to output a user interface (UI) accompanied with the electronic payment, and a processor configured to be electrically connected with the memory and the display.

According to various embodiments, the processor may detect at least one second information associated with an environment where the electronic device is operated, may determine a product to perform the electronic payment, based on the first information and the second information, and may include and output information about the product and payment information associated with payment of the product on a specified region of the UI.

According to various embodiments, the electronic device may further include at least one sensor configured to sense a change in physical quantity which has an influence on the electronic device.

According to various embodiments, if a change in physical quantity of a specified level or more to the electronic device is detected based on the at least one sensor, the processor may detect the second information.

According to various embodiments, the processor may output the UI in response to a user input provided to a specified region on the display.

According to various embodiments, the processor may divide the UI into a first region and a second region, may include any one of the information about the product and the payment information in the first region, and may include the other in the second region.

According to various embodiments, the processor may determine the product to perform the electronic payment by detecting a sound signal received from the outside as the second information and extracting product information corresponding to the sound signal from the first information.

According to various embodiments, the processor may determine the product to perform the electronic payment by detecting a location of the electronic device as the second information and extracting product information corresponding to the location from the first information.

According to various embodiments, the electronic device may further include at least one of a camera module configured to capture an image or a communication interface configured to support to transmit the image to the external server.

According to various embodiments, the processor may determine the product to perform the electronic payment by detecting at least one object included in an image or video captured by the camera module as the second information and extracting product information corresponding to the object from the first information.

According to various embodiments, the processor may determine the product to perform the electronic payment by detecting tag information included in any application stored in the electronic device as the second information and extracting product information corresponding to the tag information from the first information.

According to various embodiments, if there is no product information corresponding to the second information in the first information, the processor may determine the product to perform the electronic payment by searching an external server associated with the second information and receiving product information corresponding to the second information from the found external server.

According to various embodiments, the electronic device may further include at least one of a specified security platform or a specified biometric sensor.

According to various embodiments, the processor may perform user authentication based on at least one of the specified security platform or the specified biometric sensor in connection with operating the electronic payment.

An electronic payment method of an electronic device according to various embodiments may include storing at least one first information provided from an external server in connection with operating electronic payment, detecting at least one second information associated with an environment where the electronic device is operated, determining a product to perform the electronic payment based on the first information and the second information, and outputting a UI including information about the product and payment information associated with payment of the product.

According to various embodiments, the sensing may include detecting a change in physical quantity to the electronic device and starting to detect the second information if the change in physical quantity is greater than or equal to a specified level.

According to various embodiments, the outputting may include detecting a user input provided to a specified region on a display of the electronic device and outputting the UI if the user input is detected.

According to various embodiments, the outputting may include dividing the UI into a first region and a second region and including any one of the information about the product and the payment information in the first region and including the other in the second region.

According to various embodiments, the detecting may include detecting a sound signal received from the outside as the second information.

According to various embodiments, the determining may include extracting product information corresponding to the sound signal from the first information.

According to various embodiments, the detecting may include detecting a location of the electronic device as the second information. According to various embodiments, the determining may include extracting product information corresponding to the location from the first information.

According to various embodiments, the detecting may include detecting at least one object included in an image or video captured by a camera module included in the electronic device as the second information.

According to various embodiments, the determining may include extracting product information corresponding to the object from the first information.

According to various embodiments, the detecting may include detecting tag information included in any application stored in the electronic device as the second information.

According to various embodiments, the determining may include extracting product information corresponding to the tag information from the first information.

According to various embodiments, the determining may include searching an external server associated with the second information if there is no product information corresponding to the second information in the first information and receiving product information corresponding to the second information from the found external server.

According to various embodiments, the method may further include performing user authentication based on at least one of a specified security platform or a specified biometric sensor.

Figure 11:
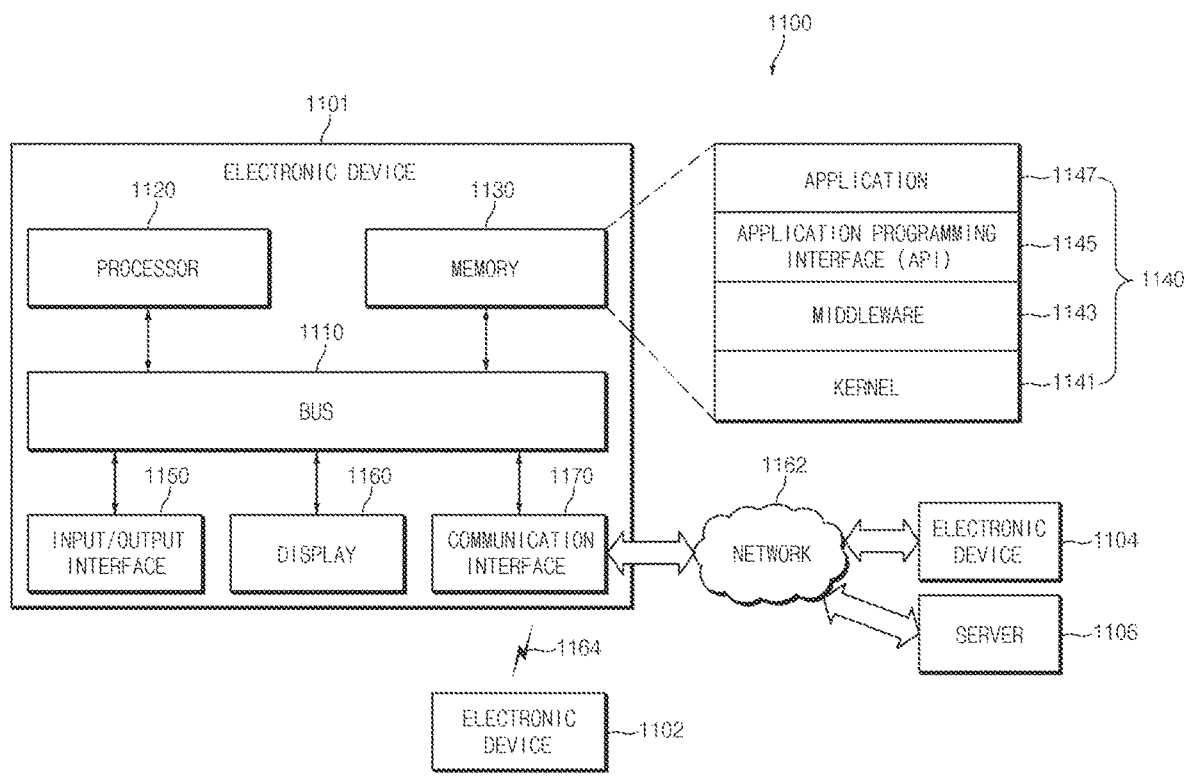
FIG. 11 is a block diagram illustrating a configuration of an electronic device in a network environment according to an embodiment.

FIG. 11 is a block diagram illustrating a configuration of an electronic device in a network environment according to an embodiment.

An electronic device 1101 in a network environment 1100 according to various embodiments of the present disclosure will be described with reference to FIG. 11. The electronic device 1101 may include a bus 1110, a processor 1120, a memory 1130, an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a central processing unit (CPU), an application processor (AP), or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to (an)other element(s) of the electronic device 1101. Furthermore, the input/output interface 1150 may output instructions or data received from (an)other element(s) of the electronic device 1101 to the user or another external device.

The display 1160 may include, for example, a liquid crystal display (LCD), a light-emitting diode (LED) display, an organic light-emitting diode (OLED) display, a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1164. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS (point of sales) device. The POS device may detect the electromagnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1162 may include at least one of telecommunications networks, for example, a computer network (e.g., local area network (LAN) or wide area network (WAN)), the Internet, or a telephone network.

The types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first electronic device 1102, the second external electronic device 1104, or the server 1106). When the electronic device 1101 should perform a certain function or service automatically or in response to a request, the electronic device 1101 may request at least a portion of functions related to the function or service from another device (e.g., the first electronic device 1102, the second external electronic device 1104, or the server 1106) instead of or in addition to performing the function or service for itself. The other electronic device (e.g., the first electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 12:
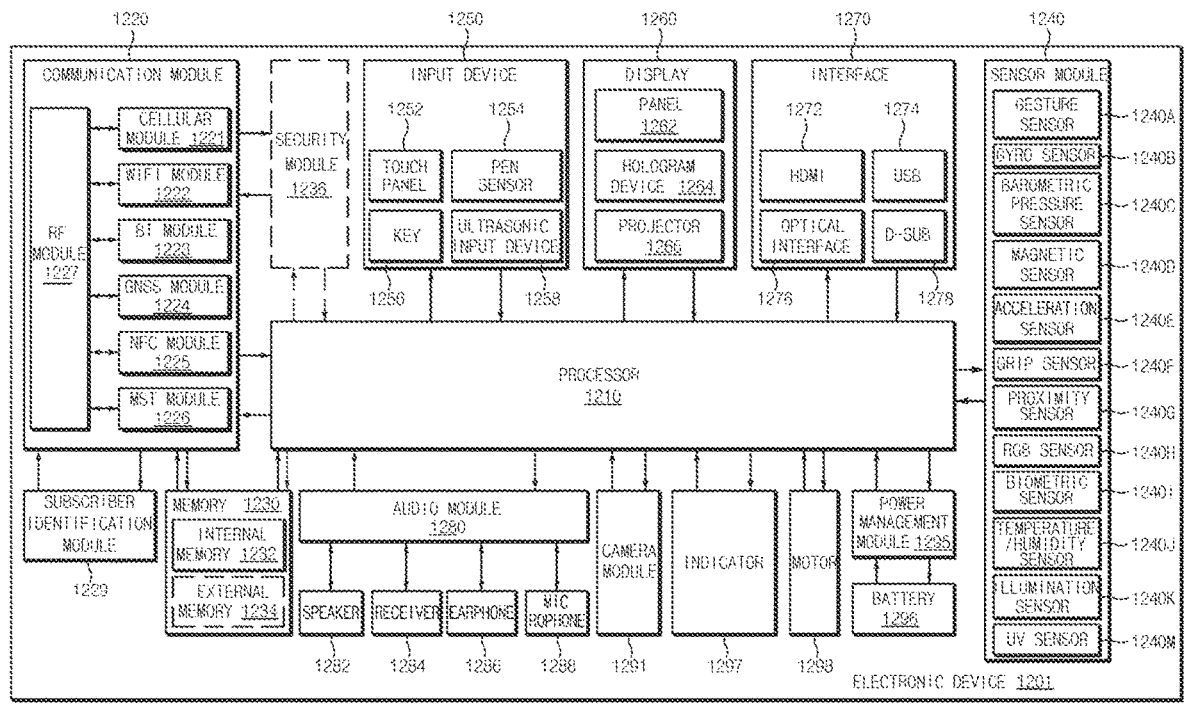
FIG. 12 is a block diagram illustrating a configuration of an electronic device according to an embodiment.

FIG. 12 is a block diagram illustrating a configuration of an electronic device according to an embodiment.

Referring to FIG. 12, the electronic device 1201 may include, for example, all or part of an electronic device 1101 shown in FIG. 11. The electronic device 1201 may include one or more processors 1210 (e.g., application processors (APs)), a communication module 1220, a subscriber identification module (SIM) 1229, a memory 1230, a security module 1236, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application program to control a plurality of hardware or software components connected thereto and may process and compute a variety of data. The processor 1210 may be implemented with, for example, a system on chip (SoC). According to an embodiment of the present disclosure, the processor 1210 may include a graphic processing unit (GPU) (not shown) and/or an image signal processor (not shown). The processor 1210 may include at least some (e.g., a cellular module 1221) of the components shown in FIG. 12. The processor 1210 may load a command or data received from at least one of other components (e.g., a non-volatile memory) into a volatile memory to process the data and may store various data in a non-volatile memory.

The communication module 1220 may have the same or similar configuration to the communication interface 1170 of FIG. 11. The communication module 1220 may include, for example, the cellular module 1221, a wireless-fidelity (Wi-Fi) module 1222, a Bluetooth (BT) module 1223, a global navigation satellite system (GNSS) module 1224 (e.g., a GPS module, a Glonass module, a Beidou module, or a Galileo module), a near field communication (NFC) module 1225, an MST module 1226, and a radio frequency (RF) module 1227.

The cellular module 1221 may provide, for example, a voice call service, a video call service, a text message service, or an Internet service, and the like through a communication network. According to an embodiment of the present disclosure, the cellular module 1221 may identify and authenticate the electronic device 1201 in a communication network using the SIM 1229 (e.g., a SIM card). According to an embodiment of the present disclosure, the cellular module 1221 may perform at least part of functions which may be provided by the processor 1210. According to an embodiment of the present disclosure, the cellular module 1221 may include a communication processor (CP).

The Wi-Fi module 1222, the BT module 1223, the GNSS module 1224, the NFC module 1225, or the MST module 1226 may include, for example, a processor for processing data transmitted and received through the corresponding module. According to various embodiments of the present disclosure, at least some (e.g., two or more) of the cellular module 1221, the Wi-Fi module 1222, the BT module 1223, the GNSS module 1224, the NFC module 1225, or the MST module 1226 may be included in one integrated chip (IC) or one IC package.

The RF module 1227 may transmit and receive, for example, a communication signal (e.g., an RF signal). Though not shown, the RF module 1227 may include, for example, a transceiver, a power amplifier module (PAM), a frequency filter, or a low noise amplifier (LNA), or an antenna, and the like. According to another embodiment of the present disclosure, at least one of the cellular module 1221, the Wi-Fi module 1222, the BT module 1223, the GNSS module 1224, the NFC module 1225, or the MST module 1226 may transmit and receive an RF signal through a separate RF module.

The SIM 1229 may include, for example, a card which includes a SIM and/or an embedded SIM. The SIM 1229 may include unique identification information (e.g., an integrated circuit card identifier (ICCID)) or subscriber information (e.g., an international mobile subscriber identity (IMSI)).

The memory 1230 (e.g., a memory 1130 of FIG. 11) may include, for example, an embedded memory 1232 or an external memory 1234. The embedded memory 1232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1234 may include a flash drive, for example, a compact flash (CF), a secure digital (SD), a micro-SD, a mini-SD, an extreme digital (xD), a multimedia card (MMC), or a memory stick, and the like. The external memory 1234 may operatively and/or physically connect with the electronic device 1201 through various interfaces.

The security module 1236 may be a module which has a relatively higher secure level than the memory 1230 and may be a circuit which stores secure data and guarantees a protected execution environment. The security module 1236 may be implemented with a separate circuit and may include a separate processor. The security module 1236 may include, for example, an embedded secure element (eSE) which is present in a removable smart chip or a removable SD card or is embedded in a fixed chip of the electronic device 1201. Also, the security module 1236 may be driven by an OS different from the OS of the electronic device 1201. For example, the security module 1236 may operate based on a java card open platform (JCOP) OS.

The sensor module 1240 may measure, for example, a physical quantity or may detect an operation state of the electronic device 1201, and may convert the measured or detected information to an electric signal. The sensor module 1240 may include at least one of, for example, a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1240 may further include a control circuit for controlling at least one or more sensors included therein. According to various embodiments of the present disclosure, the electronic device 1201 may further include a processor configured to control the sensor module 1240, as part of the processor 1210 or to be independent of the processor 1210. While the processor 1210 is in a sleep state, the electronic device 1201 may control the sensor module 1240.

The input device 1250 may include, for example, a touch panel 1252, a (digital) pen sensor 1254, a key 1256, or an ultrasonic input device 1258. The touch panel 1252 may use at least one of, for example, a capacitive type, a resistive type, an infrared type, or an ultrasonic type. Also, the touch panel 1252 may further include a control circuit. The touch panel 1252 may further include a tactile layer and may provide a tactile reaction to a user.

The (digital) pen sensor 1254 may be, for example, part of the touch panel 1252 or may include a separate sheet for recognition. The key 1256 may include, for example, a physical button, an optical key, or a keypad. The ultrasonic input device 1258 may allow the electronic device 1201 to detect a sound wave using a microphone (e.g., a microphone 1288) and to verify data through an input tool generating an ultrasonic signal.

The display 1260 (e.g., a display 1160 of FIG. 11) may include a panel 1262, a hologram device 1264, or a projector 1266. The panel 1262 may include the same or similar configuration to the display 1160. The panel 1262 may be implemented to be, for example, flexible, transparent, or wearable. The panel 1262 and the touch panel 1252 may be integrated into one module. The hologram device 1264 may show a stereoscopic image in a space using interference of light. The projector 1266 may project light onto a screen to display an image. The screen may be positioned, for example, inside or outside the electronic device 1201. According to an embodiment of the present disclosure, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature 1278. The interface 1270 may be included in, for example, the communication interface 1170 shown in FIG. 11. Additionally or alternatively, the interface 1270 may include, for example, a mobile high definition link (MHL) interface, an SD card/multimedia card (MMC) interface, or an infrared data association (IrDA) standard interface.

The audio module 1280 may convert a sound and an electric signal in dual directions. At least part of components of the audio module 1280 may be included in, for example, an input and output interface 1150 (or a user interface) shown in FIG. 11. The audio module 1280 may process sound information input or output through, for example, a speaker 1282, a receiver 1284, an earphone 1286, or the microphone 1288, and the like.

The camera module 1291 may be a device which captures a still image and a moving image. According to an embodiment of the present disclosure, the camera module 1291 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1295 may manage, for example, power of the electronic device 1201. According to an embodiment of the present disclosure, though not shown, the power management module 1295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1296 and voltage, current, or temperature thereof while the battery 1296 is charged. The battery 1296 may include, for example, a rechargeable battery or a solar battery.

The indicator 1297 may display a specific state of the electronic device 1201 or part (e.g., the processor 1210) thereof, for example, a booting state, a message state, or a charging state, and the like. The motor 1298 may convert an electric signal into mechanical vibration and may generate vibration or a haptic effect, and the like. Though not shown, the electronic device 1201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 13:
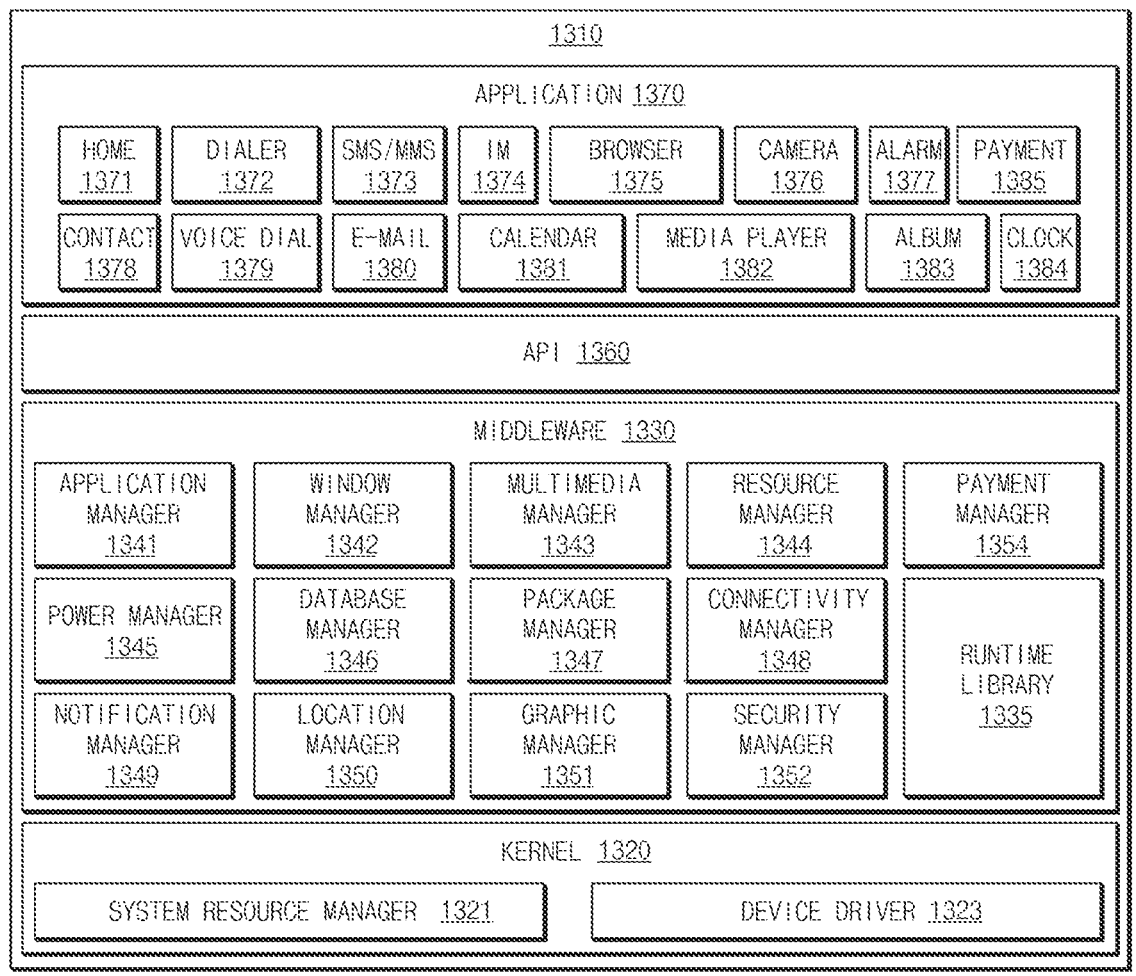
FIG. 13 is a block diagram illustrating a configuration of a program module according to various embodiments.

FIG. 13 is a block diagram illustrating a configuration of a program module according to various embodiments.

According to an embodiment of the present disclosure, the program module 1310 (e.g., a program 1140 of FIG. 11) may include an operating system (OS) for controlling resources associated with an electronic device (e.g., an electronic device 1101 of FIG. 11) and/or various applications (e.g., an application program 1147 of FIG. 11) which are executed on the OS. The OS may be, for example, Android, iOS, Windows, Symbian, Tizen, or Bada, and the like.

The program module 1310 may include a kernel 1320, a middleware 1330, an application programming interface (API) 1360, and/or an application 1370. At least part of the program module 1310 may be preloaded on the electronic device, or may be downloaded from an external electronic device (e.g., a first external electronic device 1102, a second external electronic device 1104, or a server 1106, and the like of FIG. 11).

The kernel 1320 (e.g., a kernel 1141 of FIG. 11) may include, for example, a system resource manager 1321 and/or a device driver 1323. The system resource manager 1321 may control, assign, or collect, and the like system resources. According to an embodiment of the present disclosure, the system resource manager 1321 may include a process management unit, a memory management unit, or a file system management unit, and the like. The device driver 1323 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1330 (e.g., a middleware 1143 of FIG. 11) may provide, for example, functions the application 1370 needs in common, and may provide various functions to the application 1370 through the API 1360 such that the application 1370 efficiently uses limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module used by a compiler to add a new function through a programming language while the application 1370 is executed. The runtime library 1335 may perform a function about input and output management, memory management, or an arithmetic function.

The application manager 1341 may manage, for example, a life cycle of at least one of the application 1370. The window manager 1342 may manage graphic user interface (GUI) resources used on a screen of the electronic device. The multimedia manager 1343 may determine a format utilized for reproducing various media files and may encode or decode a media file using a codec corresponding to the corresponding format. The resource manager 1344 may manage source codes of at least one of the application 1370, and may manage resources of a memory or a storage space, and the like.

The power manager 1345 may act together with, for example, a basic input/output system (BIOS) and the like, may manage a battery or a power source, and may provide power information utilized for an operation of the electronic device. The database manager 1346 may generate, search, or change a database to be used in at least one of the application 1370. The package manager 1347 may manage installation or update of an application distributed by a type of a package file.

The connectivity manager 1348 may manage, for example, wireless connection such as Wi-Fi connection or BT connection, and the like. The notification manager 1349 may display or notify events, such as an arrival message, an appointment, and proximity notification, by a method which is not disturbed to the user. The location manager 1350 may manage location information of the electronic device. The graphic manager 1351 may manage a graphic effect to be provided to the user or a user interface (UI) related to the graphic effect. The security manager 1352 may provide all security functions utilized for system security or user authentication, and the like. According to an embodiment of the present disclosure, when the electronic device (e.g., an electronic device 1101 of FIG. 11) has a phone function, the middleware 1330 may further include a telephony manager (not shown) for managing a voice or video communication function of the electronic device.

The middleware 1330 may include a middleware module which configures combinations of various functions of the above-described components. The middleware 1330 may provide a module which specializes according to kinds of OSs to provide a differentiated function. Also, the middleware 1330 may dynamically delete some of old components or may add new components.

The API 1360 (e.g., an API 1145 of FIG. 11) may be, for example, a set of API programming functions, and may be provided with different components according to OSs. For example, in case of Android or iOS, one API set may be provided according to platforms. In case of Tizen, two or more API sets may be provided according to platforms.

The application 1370 (e.g., an application program 1147 of FIG. 11) may include one or more of, for example, a home application 1371, a dialer application 1372, a short message service/multimedia message service (SMS/MMS) application 1373, an instant message (IM) application 1374, a browser application 1375, a camera application 1376, an alarm application 1377, a contact application 1378, a voice dial application 1379, an e-mail application 1380, a calendar application 1381, a media player application 1382, an album application 1383, a clock application 1384, a payment application 1385, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1370 may include an application (hereinafter, for better understanding and ease of description, referred to as "information exchange application") for exchanging information between the electronic device (e.g., the electronic device 1101 of FIG. 11) and an external electronic device (e.g., the first external electronic device 1102 or the second external electronic device 1104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1102 or the second external electronic device 1104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1102 or the second external electronic device 1104) which communicates with the electronic device, an application which operates in the external electronic device, or a service (e.g., a call service or a message service) provided from the external electronic device.

According to an embodiment of the present disclosure, the application 1370 may include an application (e.g., the health care application of a mobile medical device) which is preset according to attributes of the external electronic device (e.g., the first external electronic device 1102 or the second external electronic device 1104). According to an embodiment of the present disclosure, the application 1370 may include an application received from the external electronic device (e.g., the server 1106, the first external electronic device 1102, or the second external electronic device 1104). According to an embodiment of the present disclosure, the application 1370 may include a preloaded application or a third party application which may be downloaded from a server. Names of the components of the program module 1310 according to various embodiments of the present disclosure may differ according to kinds of OSs.

According to various embodiments of the present disclosure, at least part of the program module 1310 may be implemented with software, firmware, hardware, or at least two or more combinations thereof. At least part of the program module 1310 may be implemented (e.g., executed) by, for example, a processor (e.g., a processor 1210). At least part of the program module 1310 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. An electronic device, comprising:
    a memory configured to store a plurality of databases;
    at least one sensor;
    a display configured to output a user interface (UI) associated with the electronic payment; and
    a processor configured to be electrically connected with the memory and the display, wherein the processor is configured to:
        detect, using by a first sensor among the at least one sensor, a location where the electronic device is operated;
        receive, from the memory, a database including product information related to the location among the plurality of databases, based on location information of where the electronic device is operated;
        detect, using a second sensor among of the at least one sensor, a change in a physical quantity of one of a tilt of the electronic device or a pressure applied to the electronic device;
        in response to detecting the change, detect, using a microphone, a sound signal outputted by an external electronic device in a location where the electronic device is operated;
        identify a product based on the product information and the at least one sound signal; and
        output information about the product and payment information associated with payment for the product on a specified region of the UI.

2. The electronic device of claim 1, wherein the processor is further configured to:
    output the UI in response to a user input provided to a specified region on the display.

3. The electronic device of claim 1, wherein the processor is further configured to:
    divide the UI into a first region and a second region; and
    include any one of the information about the product and the payment information in the first region and include in the second region the other one of the information about the product and the payment information.

4. An electronic payment method of an electronic device, the method comprising:
    storing, in a memory of the electronic device, a plurality of databases;
    detecting, using by a first sensor of the electronic device, a location where the electronic device is operated;
    receiving, from the memory, a database including product information related to the location among the plurality of databases;
    detecting, using a second sensor of the electronic device, a change in a physical quantity of one of a tilt of the electronic device or a pressure which is applied to the electronic device;
    in response to detection of the change in the physical quality, detecting, using a microphone, a sound signal which is outputted from an external electronic device in a location where the electronic device is operated;
    identifying a product based on the product information and the sound signal; and
    outputting a user interface (UI) including information associated with the product and payment information associated with payment for the product.

5. The method of claim 4, wherein outputting the UI comprises:
    detecting a user input provided to a specified region on a display of the electronic device; and
    outputting the UI, if the user input is detected.

6. The method of claim 4, wherein outputting the UI comprises:
    dividing the UI into a first region and a second region; and
    including any one of the information about the product and the payment information in the first region and including in the second region the other of the information about the product and the payment information.

* * * * *